US010869185B2

(12) United States Patent
Rönneke et al.

(10) Patent No.: US 10,869,185 B2
(45) Date of Patent: Dec. 15, 2020

(54) RELIABLE DATA DELIVERY OVER NON-ACCESS STRATUM

(71) Applicant: Telefonaktiebolaget LM Ericsson (publ), Stockholm (SE)

(72) Inventors: Hans Bertil Rönneke, Kungsbacka (SE); Peter Hedman, Helsingborg (SE); Paul Schliwa-Bertling, Ljungsbro (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 43 days.

(21) Appl. No.: 16/338,818

(22) PCT Filed: Oct. 6, 2016

(86) PCT No.: PCT/EP2016/073914
§ 371 (c)(1),
(2) Date: Apr. 2, 2019

(87) PCT Pub. No.: WO2018/065060
PCT Pub. Date: Apr. 12, 2018

(65) Prior Publication Data
US 2019/0253870 A1    Aug. 15, 2019

(51) Int. Cl.
*H04W 8/08* (2009.01)
*H04W 4/70* (2018.01)
(Continued)

(52) U.S. Cl.
CPC .............. *H04W 8/08* (2013.01); *H04W 4/70* (2018.02); *H04W 8/245* (2013.01); *H04W 76/25* (2018.02); *H04W 92/045* (2013.01); *H04W 76/00* (2013.01)

(58) Field of Classification Search
None
See application file for complete search history.

(56) References Cited

U.S. PATENT DOCUMENTS

2012/0087274 A1    4/2012  Meriau
2012/0282956 A1    11/2012 Kim et al.
(Continued)

OTHER PUBLICATIONS

Author Unknown, "Technical Specification Group Services and System Aspects; Study on extended architecture support for Cellular Internet of Things (Release 14)," Technical Report 23.730, Version 1.1.0, 3GPP Organizational Partners, Sep. 2016, 53 pages.
(Continued)

*Primary Examiner* — Christopher M Crutchfield
*Assistant Examiner* — Alan L Lindenbaum
(74) *Attorney, Agent, or Firm* — Withrow & Terranova, PLLC

(57) ABSTRACT

The present disclosure is directed to method in a mobility management node and such a node for delivering data to a wireless communication device (WCD) served by the mobility management node, operating in a communication network comprising a network entity (NE) and a radio access network (RAN) node serving the WCD, the method comprises: obtaining capability information indicating whether the RAN node supports acknowledgement of a successful delivery of data to the WCD; receiving a data message sent by the NE comprising user data intended for the WCD; sending a control plane message comprising the user data to the RAN node for further delivery to the WCD; sending a response to the NE indicating the outcome of the data delivery.

26 Claims, 9 Drawing Sheets

(51) Int. Cl.
*H04W 92/04* (2009.01)
*H04W 76/25* (2018.01)
*H04W 8/24* (2009.01)
*H04W 76/00* (2018.01)

(56) References Cited

U.S. PATENT DOCUMENTS

2013/0268820 A1* 10/2013 Sun ............. H04L 5/0048 714/748
2015/0103766 A1* 4/2015 Miklos ............. H04W 76/20 370/329
2017/0311371 A1* 10/2017 Olsson ............. H04W 76/19

OTHER PUBLICATIONS

Author Unknown, "Technical Specification Group Services and System Aspects; Policy and charging control architecture (Release 14)," Technical Specification 23.203, Version 14.1.0, 3GPP Organizational Partners, Sep. 2016, 253 pages.

Author Unknown, "Technical Specification Group Services and System Aspects; General Packet Radio Service (GPRS) enhancements for Evolved Universal Terrestrial Radio Access Network (E-UTRAN) access (Release 14)," Technical Specification 23.401, Version 14.1.0, 3GPP Organizational Partners, Sep. 2016, 379 pages.

Author Unknown, "Technical Specification Group Services and System Aspects; Architecture enhancements to facilitate communications with packet data networks and applications (Release 14)," Technical Specification 23.682, Version 14.1.0, 3GPP Organizational Partners, Sep. 2016, 99 pages.

Author Unknown, "Technical Specification Group Radio Access Network; Evolved Universal Terrestrial Radio Access Network (E-UTRAN); S1 Application Protocol (S1AP) (Release 14)," Technical Specification 36.413, Version 14.0.0, 3GPP Organizational Partners, Sep. 2016, 333 pages.

Ericsson, "S2-166941: Reliable UE delivery based on hop-by-hop acknowledgements (5c)," Change Request 3131 for Technical Specification 23.401, Third Generation Partnership Project (3GPP), SA WG2 Meeting #118, Nov. 14-18, 2016, 19 pages, Reno, Nevada, USA.

Vodafone, "S2-165216: NB-IoT Reliable Message Service," Third Generation Partnership Project (3GPP), SA WG2 Meeting #116bis, Aug. 29-Sep. 2, 2016, 5 pages, Sanya, China.

International Search Report and Written Opinion for International Patent Application No. PCT/EP2016/073914, dated Mar. 31, 2017, 13 pages.

Examination Report for Indian Patent Application No. 201917011057, dated Sep. 30, 2020, 6 pages.

Notification of Reason for Refusal for Korean Patent Application No. 10-2019-7012739, dated Oct. 12, 2020, 14 pages.

Examination Report for European Patent Application No. 16778793. 6, dated Nov. 10, 2020, 4 pages.

* cited by examiner

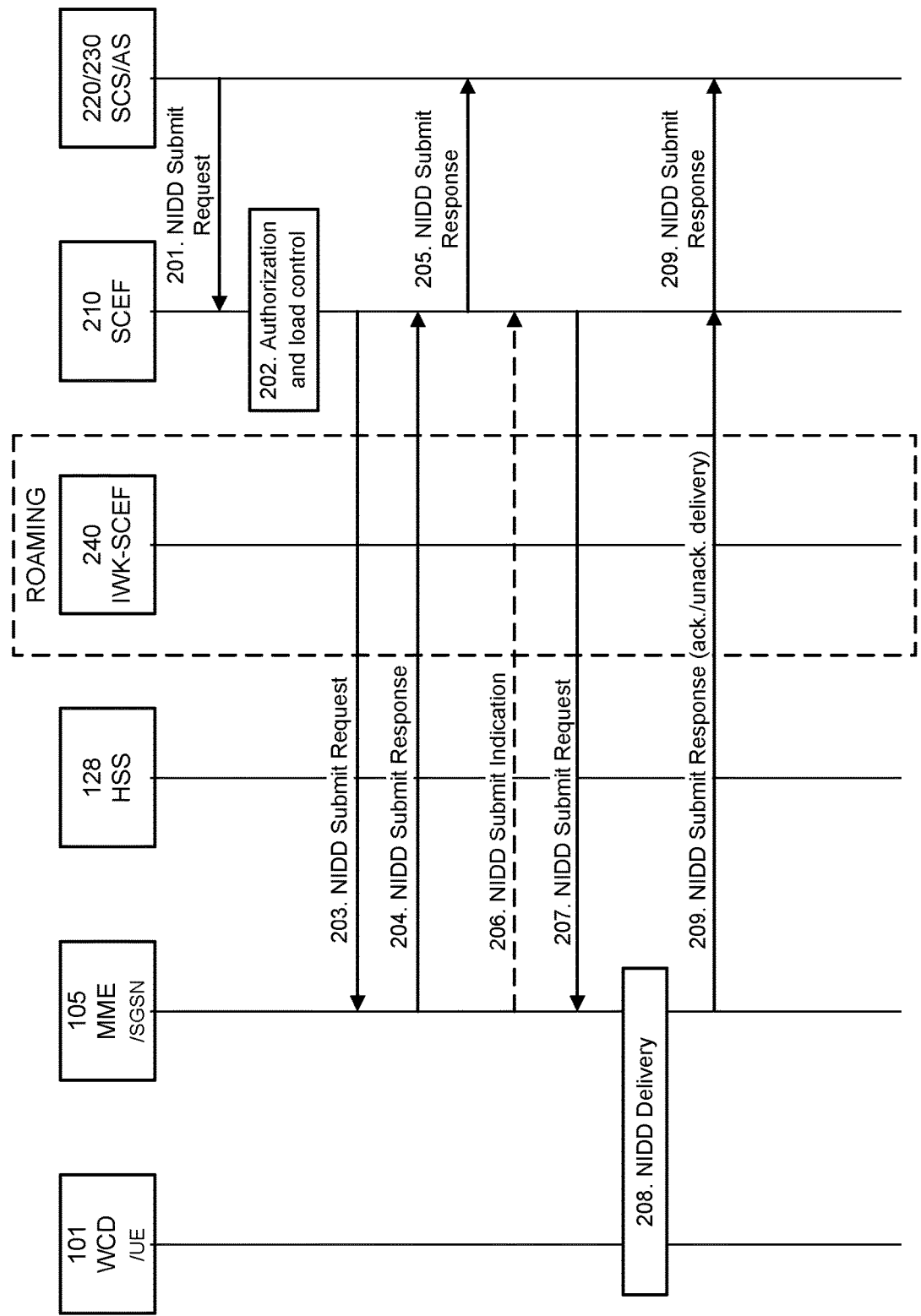

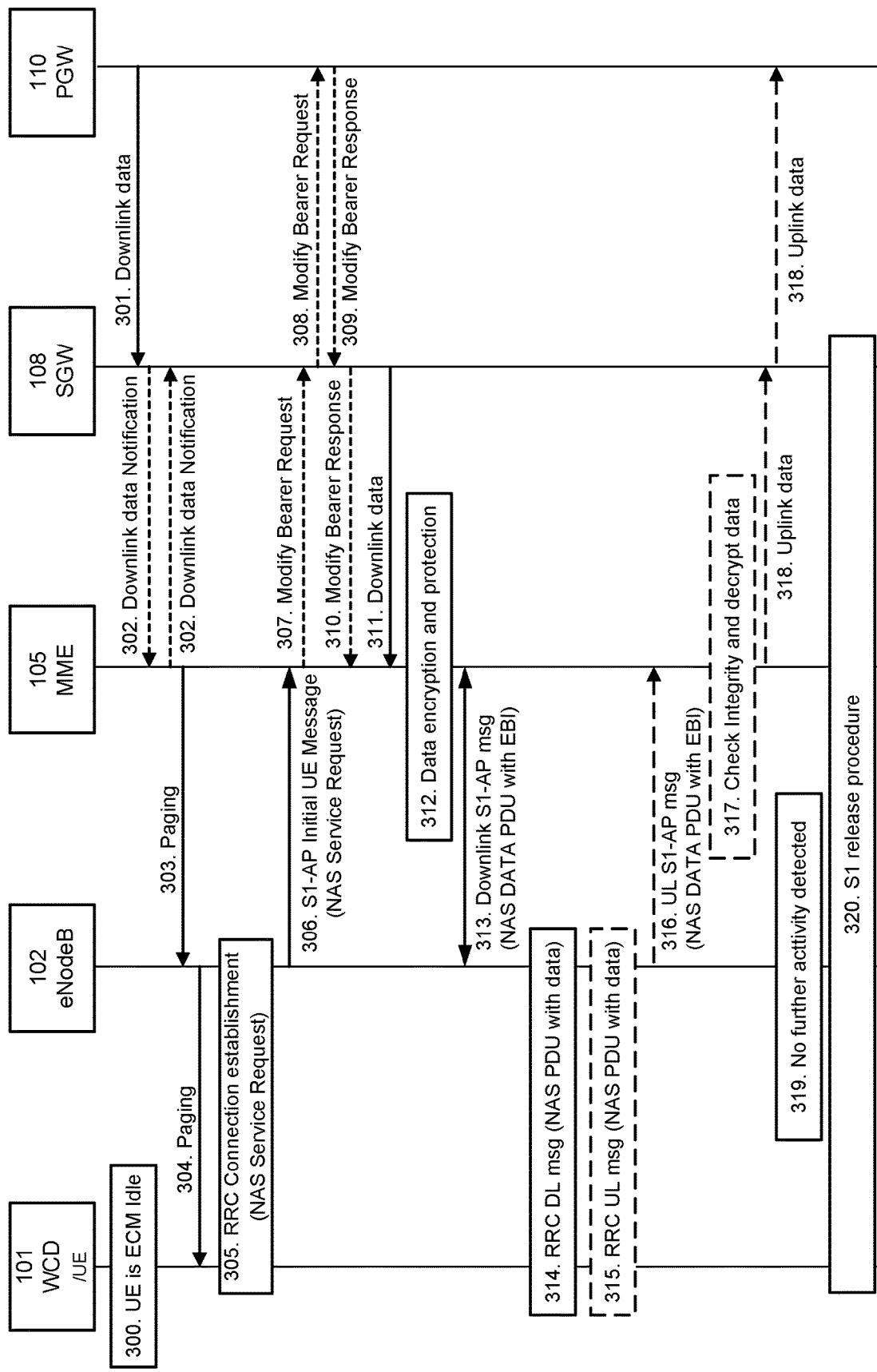

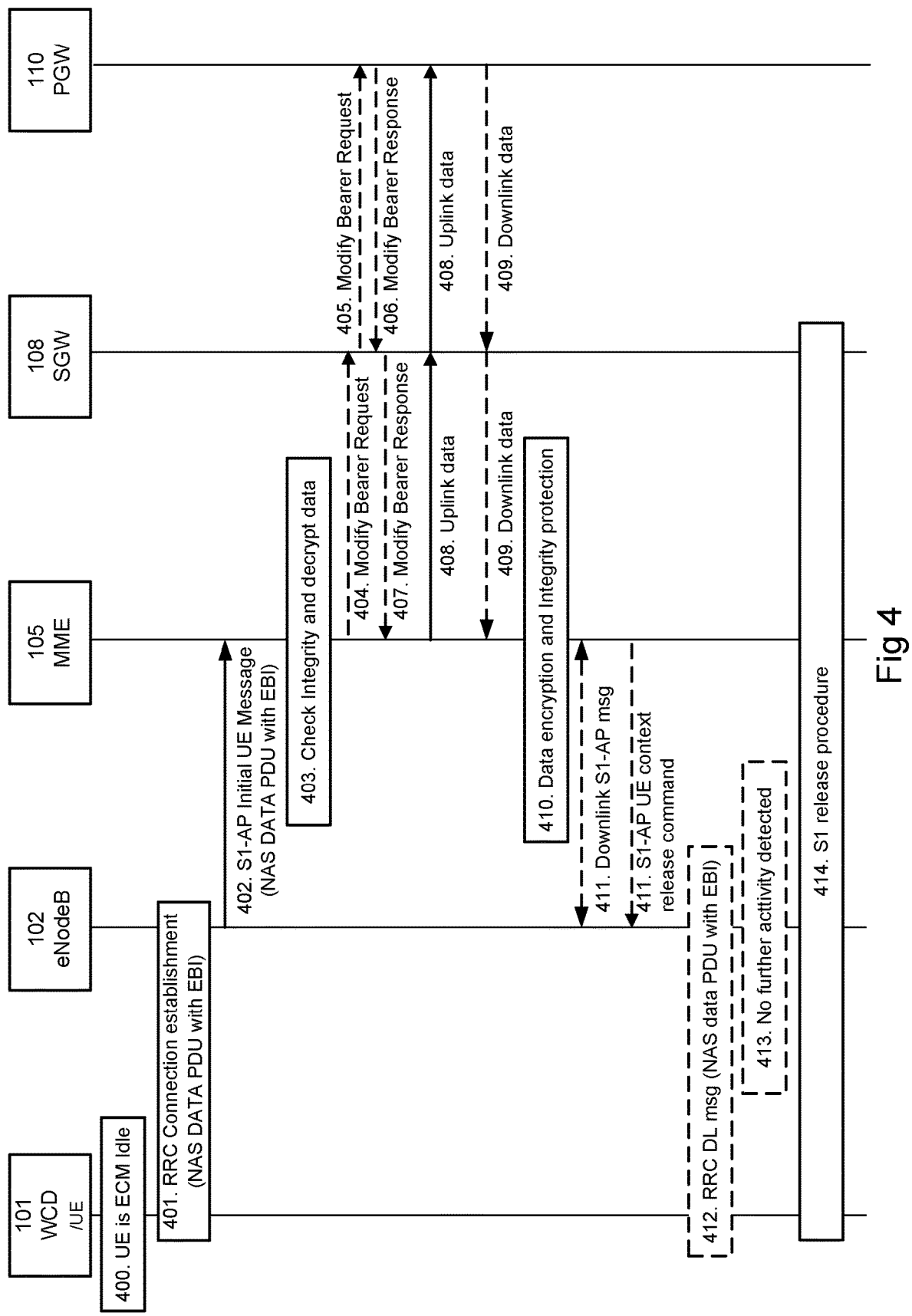

RELIABLE DATA DELIVERY OVER NON-ACCESS STRATUM

This application is a 35 U.S.C. § 371 national phase filing of International Application No. PCT/EP2016/073914, filed Oct. 6, 2016, the disclosure of which is incorporated herein by reference in its entirety.

TECHNICAL FIELD

The invention relates to a method in a mobility management node and a mobility management node for delivering user data to wireless communication device where the user data is sent by a Network Entity (NE), e.g. a Service Capability Exposure Function (SCEF).

BACKGROUND

A Global System for Mobile communications (GSM) or a Universal Mobile Telecommunications System (UMTS) or a Long-Term Evolution (LTE) network or similar is, like most other cellular networks, basically a network of individual cells each covering a small geographical area. Each cell is associated with a radio access node (e.g. a base station or similar) for communicating wirelessly with a WCD located within the cell. By combining the coverage of all cells of a cellular network and their corresponding radio access nodes extends the coverage of the cellular network over a much wider area than a single cell.

In GSM EDGE Radio Access Network (GERAN)/UMTS Terrestrial Radio Access Network (UTRAN) a number of adjacent or neighbouring cells can be grouped into a so-called Routing Area (RA), and into a so-called Tracking Area (TA) in Evolved UTRAN (E-UTRAN). A mobility procedure in the form of a Tracking Area Update (TAU) or a Routing Area Update (RAU) is initiated when a UE enters a new TA or RA respectively. The mobility procedure may e.g. be initiated by moving UE.

Another mobility procedure in cellular networks is the so-called handover procedure, which is the process of transferring an ongoing session such as a call or data session or similar from one radio access node to another radio access node without loss or interruption of service. Typically, handover occurs when a UE moves away from the area covered by one cell and entering the area covered by another cell, whereupon the ongoing session is transferred to the second cell in order to avoid service termination Handover may occur in other situations, e.g. handover from a first cell to second cell when the UE is located in an area overlapped by both cell and the capacity of the first cell is exhausted, or handover from a macro cell to a nearby micro cell to off load the macro cell etc.

The above mentioned and exemplifying mobility procedures TAU, RAU and handover are well known to those skilled in the art and they need no detailed description as such.

FIG. 1a is shows a schematic block diagram illustrating a known communication network 10a wherein embodiments of the present solution may be implemented. The wireless communication network 10a comprises a Radio Access Network (RAN) 103 in turn comprising a RAN node 102 connected to a Mobility Management Entity (MME) 105 and to a Serving Gateway (SGW) 108, in turn connected to the MME 105, and a Packet Data Network Gateway (PGW) 110, which in turn is connected to a Policy and Charging Rules Function (PCRF) 130. The RAN node 102 is a radio access node that interfaces with a wireless communication device (WCD).

The WCD, as exemplified by an UE 101 in FIG. 1a, is a device by which a subscriber accesses services offered by an operator's network and services outside operator's network to which the operators radio access network and core network provide access, e.g. access to the Internet (c.f. the Packet Data Network (PDN) 115 in FIG. 1a). The UE 101 in FIG. 1a may be any device, mobile or stationary, enabled to communicate in the communications network, for instance but not limited to e.g. user equipment, mobile phone, smart phone, sensors, meters, vehicles, household appliances, medical appliances, media players, cameras, Machine to Machine (M2M) device, Device to Device (D2D) device, Internet of Things (IoT) device or any type of consumer electronic, for instance but not limited to television, radio, lighting arrangements, tablet computer, laptop or Personal Computer (PC). The UE 101 may be portable, pocket storable, hand held, computer comprised, or vehicle mounted devices, enabled to communicate voice and/or data, via the radio access network, with another entity, such as another UE or a server.

The RAN 103 in FIG. 1a is represented by an Evolved-Universal Terrestrial Radio Access Network (E-UTRAN) and the RAN node 102 in the E-UTRAN is represented by an evolved NodeB (eNode B, eNB). However, the RAN node may for example be a base station (in the GSM EDGE Radio Access Network (GERAN) 122), a NodeB (in the Universal Terrestrial Radio Access Network (UTRAN) 125), Radio Network Controller (RNC) (in the UTRAN 125) or any other element capable of wireless communication with the UE 101 or similar at one end and a Core Network (CN) serving the UE 101 at the other end. The reference point between the UE 101 and the E-UTRAN 103 may be referred to as Long Term Evolution-Uu (LTE-Uu). GSM is short for Global System for Mobile Communications and EDGE is short for Enhanced Data Rates for GSM Evolution.

The MME 105 is connected to the E-UTRAN 101 via the reference point S1-MME, also known as the S1-interface for the MME. The S1 Application Protocol (S1AP) supports the functions of S1 interface by signalling procedures, e.g. as defined in the specification 3GPP TS 36.413 V14.0.0 (2016-09) 3rd Generation Partnership Project; Technical Specification Group Radio Access Network; Evolved Universal Terrestrial Radio Access Network (E-UTRAN); S1 Application Protocol (S1AP) (Release 14). The MME 105 is an element having functions such as e.g. Non-Access Stratum (NAS) signalling, Inter Core Network (CN) node signalling for mobility between 3rd Generation Partnership Project (3GPP) access networks, UE reachability, Tracking Area (TA) list management, PGW and SGW selection, MME selection for handover with MME change etc. S10 is the reference point between MMEs 105 for MME relocation and MME to MME information transfer.

The SGW 108 routes and forwards user data packets for the UE 101 over the S1-U interface, whilst also acting as the mobility anchor for the user plane of the UE 101 during inter-eNodeB handovers and as the anchor for mobility between LTE and other 3GPP technologies (terminating $S_4$ interface and relaying the traffic between 2G/3G systems and the PGW 110a). For idle state UEs, the SGW terminates the downlink (DL) data path and triggers paging when DL data arrives for the UE 101 and further manages and stores UE contexts, e.g. parameters of the IP bearer service, network internal routing information. It also performs replication of the user traffic in case of lawful interception. The SGW communicates with the MME 105 via the S11 interface and with the PGW 110*a* via the S5 interface. Further, the SGW may communicate with the UTRAN 125 and with the GERAN 122 via the S12 interface.

The PGW 110*a* is the gateway which terminates the SGi interface towards the Packet Data Network (PDN) 115. The PDN 115 is illustrated in FIG. 1*a* by the Operator's IP Services (e.g. IMS, PSS etc.). IMS is short for IP Multimedia Subsystem or IM Multimedia core network Subsystem and PSS is short for Packet Switched Streaming. If the UE 101 is accessing multiple PDNs, there may be more than one PGW 110*a* for that UE 101. Functions of the PGW 110*a* are e.g. providing connectivity from the UE 101 to external PDNs by being the point of exit and entry of traffic for the UE 101 with respect to the Core Network (CN) of the communications network 10*a*, performing policy enforcement, packet filtering for each user, charging support, lawful interception and packet screening etc. S5 is the reference point which provides user plane tunnelling and tunnel management between the SGW 108 and the PGW 110*a*.

The SGSN 118 is responsible for the delivery of data packets from and to the UE's 101 within its geographical service area. One of the SGSN's 118 functions is to provide signaling for mobility between 2G/3G and E-UTRAN 103 access networks. 2G/3G access network are exemplified with GERAN 122 and UTRAN 125 in FIG. 1*a*. Some further functions of the SGSN 118 are to handle packet routing and transfer, mobility management (attach/detach and location management), logical link management, and authentication and charging functions etc. S3 is the interface between the SGSN 118 and the MME 105. S4 is a reference point between the SGSN 118 and the SGW 108. S12 is the reference point between the SGW 108 and the UTRAN 125. In some embodiments, the SGSN 118 and the MME 105 are co-located in one node. In this text, the term MME/SGSN will refer to any one of a standalone MME 105 or a standalone SGSN 108 or a combined MME 105 and SGSN 118 node. The SGSN 118 may also be referred to as a S4-SGSN. In the following, when the term MME is used, it refers to any of the standalone MME, a combined MME/SGSN or a combined MME/S4-SGSN. The term MME is used for the sake of simplicity.

The Home Subscriber Server (HSS) 128 is a subscriber server node similar to the GSM Home Location Register (HLR) and Authentication Centre (AuC). The HSS 128 comprises subscriber-related information (subscriber profiles), performs authentication and authorization of the user, and may provide information about the subscriber's location and IP information. The reference point S6*a* enables transfer of subscription and authentication data for authenticating/authorizing user access to the evolved system between the MME 105 and the HSS 128.

The PCRF 130 is a policy and charging control element. The PCRF 130 encompasses policy control decision and flow based charging control functionalities, it provides network control regarding the service data flow detection, gating, Quality of Service (QoS) and flow based charging etc. The PCRF 130 may be described as a functional entity which may be a standalone node or a function implemented in another node. The reference point Gx provides transfer of (QoS) policy and charging rules from the PCRF 130 to a Policy and Charging Enforcement Function (PCEF) in the PGW 110*a* or similar. Rx is the reference point which resides between the PCRF 130 and the Operator's IP Services represented by the PDN 115 in FIG. 1*a*. The Rx reference point is used to exchange application level session information between the PCRF 130 and one or more Application Functions (AF) (not shown).

In some embodiments, a communications network may be divided into a RAN and a Core Network (CN). Thus, the UE 101 reaches the CN using a suitable RAN technology, for example the E-UTRAN 103 as exemplified in FIG. 1*a*. Note that FIG. 1*a* uses E-UTRAN 103 as an example, and that the UE 101 may reach the CN using any other suitable access technology, both 3GPP technologies and non-3GPP technologies.

As described above, the E-UTRAN 103 may comprise a RAN node such as e.g. an eNB 102. Using FIG. 1*a* as an example, the CN may comprise several or even all of the MME 105, the SGWs 108, the PGW 110*a*, the SGSN 118, the HSS 128 and the PCRF 130. The RAN and the CN may each comprises additional entities not shown in FIG. 1*a*. The CN may be a Packet Switched (PS) core network or a Circuit Switched (CS) core network. In other embodiments, the communications network 10*a* is not divided into a RAN and a CN. Instead, the communications network 10*a* may comprise a virtualized CN, and the control and user planes may be split. Terms such as Software Defined Network (SDN), Network Functions Virtualization (NFV) and Network Virtualization (NV) may be used in a scenario with a virtualized CN where the control and user planes are split. The user plane (sometimes known as the data plane, forwarding plane, carrier plane or bearer plane) carries the network user traffic and that the control plane carries signalling traffic. As the SDN may decouple the user and control planes, it removes the control plane from network hardware and implements it in software instead, which enables programmatic access and, as a result, makes network administration much more flexible. The control plane signalling may be routed to the virtualized CN and the user plane signalling is bypassed the virtualized CN. A virtualized CN may comprise virtual network services enabled by a virtualized MME (vMME), virtualized SGSN (vSGSN), virtualized PGW (vPGW), virtualized SGW (vSGW), virtualized Gateway GPRS Support Node (vGGSN), virtualized PCRF (vPCRF), virtualized Deep Packet Inspection (vDPI), vProbe, virtualized Evolved Packet Data Gateway (vePDG) and virtualized Trusted Wireless Local Area Network Access Gateway (vTWAG) etc.

It should be noted that the communication links in the communications systems seen in FIG. 1*a* may be of any suitable kind including either a wired or wireless link. The link may use any suitable protocol depending on type and level of layer (e.g. as indicated by the Open Systems Interconnection (OSI) model) as understood by the person skilled in the art.

FIG. 1*b* shows a schematic block diagram illustrating a known communication network 10*b* wherein embodiments of the present solution may be implemented. In particular, FIG. 1*b* shows an architecture for a User Equipment (UE) used for non-roaming Machine Type Communication (MTC) connecting to the 3GPP network (UTRAN, E-UTRAN, GERAN, etc.) via the Um/Uu/LTE-Uu interfaces. FIG. 1*b* also shows the 3GPP network service capability exposure to Service Capability Server (SCS) and Application Server (AS).

FIG. 1*c* shows a schematic block diagram illustrating a known communication network 10*b* wherein embodiments of the present solution may be implemented. In particular, FIG. 1*c* shows an architecture for a User Equipment (UE) used for roaming Machine Type Communication (MTC) connecting to the 3GPP network (UTRAN, E-UTRAN, GERAN, etc.) via the Um/Uu/LTE-Uu interfaces. FIG. 1c also shows the 3GPP network service capability exposure to Service Capability Server (SCS) and Application Server (AS).

FIGS. 10b and 10c are copied from the above mentioned specification 3GPP TS 23.682 V14.1.0 (2016-09), which specifies architecture enhancements to facilitate communications with packet data networks and applications (e.g. Machine Type Communication (MTC) applications on the (external) network/MTC servers. Both roaming and non-roaming scenarios are covered. The specification TS 23.682 also specifies transmission of non-IP data via Service Capability Exposure Function (SCEF) and Interworking SCEF (IWK-SCEF) for the Cellular Internet of Things (CIoT) Evolved Packet Core (EPS) Optimization.

Reference points (interfaces) shown in FIGS. 10b-10c are:

Tsms: Reference point used by an entity outside the 3GPP network to communicate with UEs used for MTC via SMS.
Tsp: Reference point used by a SCS to communicate with the MTC-IWF related control plane signalling.
T4: Reference point used between MTC-IWF and the SMS-SC in the HPLMN.
T6a: Reference point used between SCEF and serving MME.
T6b: Reference point used between SCEF and serving SGSN.
T6ai: Reference point used between IWK-SCEF and serving MME.
T6bi: Reference point used between IWK-SCEF and serving SGSN.
T7: Reference point used between IWK-SCEF and SCEF.
S6m: Reference point used by MTC-IWF to interrogate HSS/HLR.
S6n: Reference point used by MTC-AAA to interrogate HSS/HLR.
S6t: Reference point used between SCEF and HSS.
Rx: Reference point used by SCEF and PCRF. Functionality for Rx reference point is specified in TS 23.203 [27].
Ns: Reference point used between SCEF and RCAF.
Nt: Reference point used by SCEF and PCRF. Functionality for Nt reference point is specified in TS 23.203 [27].
Nu: Reference point used by SCEF to interact with the PFDF.

The Service Capability Exposure Function (SCEF) 210 shown in FIGS. 10b-10c is the key entity within the 3GPP architecture for service capability exposure that provides a means to securely expose the services and capabilities provided by 3GPP network interfaces. MTC-IWF may be co-located with SCEF in which case Tsp functionality would be exposed via API, functions provided by the MME/SGSN (e.g. NIDD and Event Monitoring) would be exposed to the MTC-IWF by the SCEF and functions provided by the MTC-IWF (e.g. T4 Triggering) would be available to the SCEF. When they are not co-located, the SCEF may access MTC-IWF functionality via the Tsp interface. Defining interfaces that permit the SCEF to access services or capabilities at either a new or an existing 3GPP Network Element lies within 3GPP scope. The choice of which protocols to specify for such new 3GPP interfaces (e.g. DIAMETER, RESTful APIs, XML over HTTP, etc.) will depend on multiple factors including but not limited to the needs of that specific interface or ease of exposure of requested information. A capability of the SCEF is to monitor and provide notifications of desired events to the AS (Application Server) regarding a UE. For example, the SCEF can be the interface for small data transfers and control messaging between Enterprises and the Operators Core Network (CN). The Interworking SCEF (IWK-SCEF) 240 shown in FIGS. 10b-10c is optional. When deployed, the IWK-SCEF is located in the Visited PLMN (VPLMN) as shown in FIG. 1c.

Service Capability Server (SCS) 220 shown in FIGS. 10b-10c enables applications to access and use functionality provided by service components over standardized interfaces (APIs). An SCS hosts one or several service components. For example, in the 3GPP IP Multimedia Subsystem (IMS) architecture, the SCS may be a gateway device which translates Session Initiation Protocol (SIP) signalling into an Open Service Access (OSA) Application Programming Interface (API) and vice versa. As such, the SCS may be positioned between the Serving Call Session Control Function (S-CSCF) and the OSA service environment.

Application Server (AS) 230 shown in FIGS. 10b-10c may be seen as a type of server designed to install, operate and host applications and associated services for end users, IT services and organizations. It facilitates the hosting and delivery of high-end consumer or business applications, which are used by multiple and simultaneously connected local or remote users. An AS may consists of a server operating system (OS) and server hardware that work together to provide computing-intensive operations and services to the residing application. An AS may execute and provide user and/or other application access when utilizing the installed application's business/functional logic. Key required features of an AS may include data redundancy, high availability, load balancing, user management, data/application security and a centralized management interface. An AS may be connected by enterprise systems, networks or intranet and remotely accessed via the Internet. Depending on the installed application, an AS may be classified in a variety of ways, e.g. as a Web server, database application server, general purpose application server or enterprise application (EA) server.

The Third Generation Partnership Project (3GPP) specifications have recently provided support for Non-Internet Protocol (IP) (Non-IP) Data Delivery (NIDD) as part of the Cellular Internet of Things (CIoT) Evolved Packet System (EPS) optimizations, see e.g. the specification 3GPP TS 23.682 V14.1.0 (2016-09) 3rd Generation Partnership Project; Technical Specification Group Services and System Aspects; Architecture enhancements to facilitate communications with packet data networks and applications (Release 14). For example, the Non-Access Stratum (NAS) protocol has been extended to allow small amounts of data to be transferred over the control plane using NIDD.

For the data delivery over NAS (e.g. DoNAS or "Control Plane CIoT Optimization") which was introduced in 3GPP Release-13, there is a problem with reliable delivery that has been studied in a Release-14 study, see key issue #2 (clause 5.2) and solution #5 (clause 6.5) in the technical report 3GPP TR 23.730 V1.1.0 (2016-09) Technical Report 3rd Generation Partnership Project; Technical Specification Group Services and System Aspects; Study on extended architecture support for Cellular Internet of Things (Release 14).

The technical report 3GPP TR 23.730 discusses alternative delivery of data over NAS in alternative 5c "Based on hop by hop acknowledgment" in clause 6.5.1.4 and in alternative 5d in clause 6.5.1.5. Alternative 5c builds on 5d, such that 5d provides a Negative acknowledgement (unsuccessful delivery) and 5c provides both a Positive acknowledgement (successful delivery) and a Negative acknowledgement (based on 5d).

However, the eNB or similar in the serving Public Land Mobile Network (PLMN), e.g. in a Visited PLMN, may or may not be upgraded to support the Rel-14 reliability hop-by-hop feature (alternative 5c in TR 23.730 above). It is important that the SCEF knows if a reliable delivery was used or not. For example, the SCEF or the AS may decide to switch to application level acknowledgements i.e. UE-AS, if the reliability hop-by-hop feature is not supported by the 3GPP access in the cell where the device is camping.

Another problem is that the 3GPP standard does not specify any remedying action that the Mobility Management Entity (MME) may take in case the MME receives a Negative acknowledgement (S1-AP Non Delivery Indication).

SUMMARY

An object of the present invention is to solve, or at least mitigate, the problem(s) mentioned or indicated above.

This object is attained in a first aspect of the present solution directed to a method in a mobility management node for delivering data to a wireless communication device, WCD, served by the mobility management node, operating in a communication network comprising a network entity, NE, and a radio access network, RAN, node serving the WCD, the method comprises: obtaining capability information indicating whether the RAN node supports acknowledgement of a successful delivery of data to the WCD; receiving a data message sent by the NE comprising user data intended for the WCD; sending a control plane message comprising the user data to the RAN node for further delivery to the WCD; sending a response to the NE indicating an unsuccessful delivery of the user data to the WCD when a report is received from the RAN node indicating that the user data was not successfully delivered to the WCD; and otherwise indicating an acknowledged delivery of the user data to the WCD when the RAN node supports said acknowledgement and an acknowledgement is received from the RAN node indicating that the user data was successfully delivered to the WCD and indicating an unacknowledged delivery of user data to the WCD when the RAN node does not support said acknowledgement.

This object is attained in a second aspect of the present solution directed to a mobility management node for delivering data to a wireless communication device, WCD, where the mobility management node is configured to operatively serve the WCD in a communication network comprising a network entity, NE, and a radio access network, RAN, node serving the WCD, the mobility management node comprises: a network interface; one or more processors; and memory storing instructions executable by the one or more processors whereby the mobility management node is operable to: obtain capability information indicating whether the RAN node supports acknowledgement of a successful delivery of data to the WCD; receive a data message sent by the NE comprising user data intended for the WCD; send a control plane message comprising the user data to the RAN node for further delivery to the WCD; send a response to the NE indicating an unsuccessful delivery of the user data to the WCD when a report is received from the RAN node indicating that the user data was not successfully delivered to the WCD, and otherwise indicating an acknowledged delivery of the user data to the WCD when the RAN node supports said acknowledgement and an acknowledgement is received from the RAN node indicating that the user data was successfully delivered to the WCD and indicating an unacknowledged delivery of user data to the WCD when the RAN node does not support said acknowledgement.

The above indicated embodiments provides an acknowledgment scheme which discovers if reliable hop-by-hop delivery of Data over NAS can be provided in the current cell of the WCD. For mobile WCDs and WCDs in roaming situation this is especially advantageous, since e.g. home operator network may not be fully upgraded or the home operator has no control of support in visited operator's network.

For example, the SCEF will know if reliable delivery of DoNAS data was used or not. If not used, the SCEF or the AS can for example switch to using acknowledged mode on application level instead. However it is preferred not to use application layer acknowledgements since these consumes more battery in the device and more resources in the network, but is an alternative method for guarantee reliable delivery.

The above indicated embodiments and further embodiments of the invention will be discussed in more detail in the detailed description hereinbelow with reference made to the accompanying drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which:

FIG. 2 shows a signalling diagram illustrating the delivering of data to a WCD sent by a SCEF according to an embodiment of the present solution;

FIG. 3 shows a signalling diagram illustrating some details of a delivery of data to a WCD sent by a SCEF according to an embodiment of the present solution;

FIG. 4 shows a signalling diagram illustrating some details of a the delivery of data to a WCD sent by a SCEF according to an embodiment of the present solution;

DETAILED DESCRIPTION

Figure 1A:
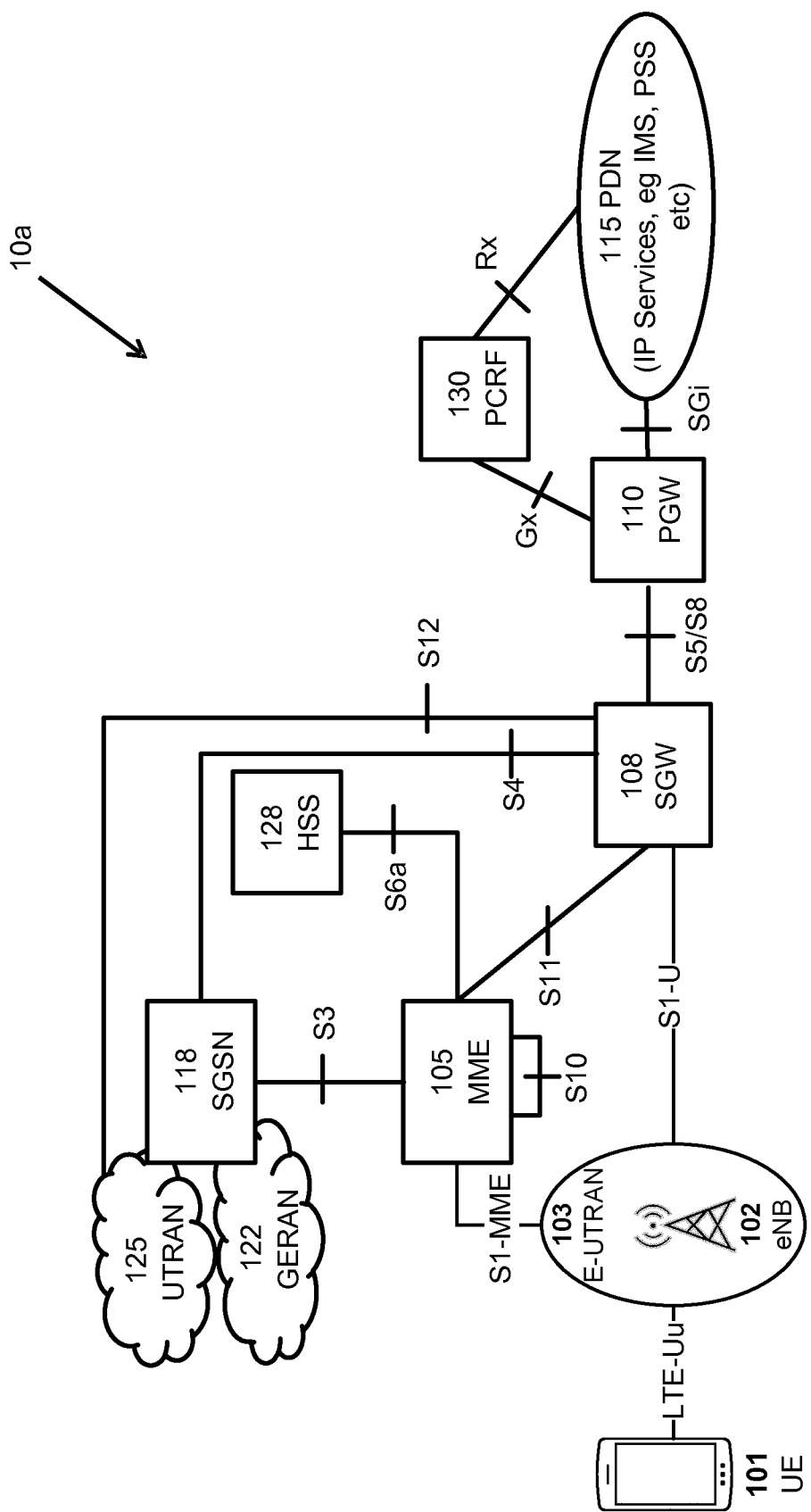
FIG. 1a shows a schematic block diagram of a known communication network (10a) wherein embodiments of the present solution may be performed.

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Embodiments described herein may comprise one or more of the following properties:

1) A new cause code may be sent from the MME to the SCEF, which cause code can distinguish two successful deliveries, i.e. acknowledged delivery from unacknowledged delivery, in addition to delivery failure (undelivered).

Acknowledged delivery means that RLC Acknowledged mode is known to have been used and successful delivery was indicated Unacknowledged delivery means that either a) RLC unacknowledged delivery was used, or b) RLC acknowledged delivery was used but the successful result has not been propagated to the MME (is unknown in MME). For both a) and b) cases delivery is considered successful.

Delivery failure (undelivered) is when the MME knows that delivery was not possible to the device. This may e.g. be done by legacy indication S1-AP NAS NON DELIVERY INDICATION as described in solution 5d in TR 23.730.

2) A new capability indication may be added in the S1-AP INITIAL UE MESSAGE that DL NAS Data acknowledgements from the eNB to the MME are supported. This indication may be added in the S1-AP INITIAL UE MESSAGE, e.g. when used for NAS Service Request, for Attach request, or for Tracking Area Update request.

3) A new indication may be added in the S1-AP DOWNLINK NAS TRANSPORT message indicating that MME requests acknowledgement from the eNB (positive and negative depending on result) of the DL NAS Data delivery result. This indication may be added in the S1-AP DOWNLINK NAS TRANSPORT to request the eNB to use the Acknowledged mode of the RLC protocol and to return the result back to the MME. A positive result may be indicated back to MME in an existing message or a new message e.g. "S1-AP: NAS DELIVERY INDICATION". A negative result may be indicated back to MME in the existing message "S1-AP: NAS NON DELIVERY INDICATION" or a new message e.g. with a specific parameter in the new message above "S1-AP: NAS DELIVERY INDICATION".

4) Retransmission of UL NAS data in the UE based on the transmission result indicated from the RLC layer when RLC acknowledged mode is used. The RLC Acknowledged mode has not been used to secure delivery of NAS PDUs or at least not been used for retransmission, since NAS is typically acknowledged on NAS level and therefore has its own retransmission mechanisms (using NAS time out and retransmission count). Thus, the MME shall resend DL data in case the MME receives a Negative acknowledgement (S1-AP Non Delivery Indication). This is advantageous since 3GPP devices using DoNAS ("Control Plane CIoT Optimization" in the 3GPP specs) may suddenly change to another cell or eNB during a transmission of UL and DL packets. The MME shall retransmit any failed DL DoNAS packets as soon as the 3GPP device has connected to the new cell or eNB.

5) Retransmission of DL NAS data in the MME based on the transmission result indicated over S1-AP (see TR 23.730 solution 5c/5d) originating from the RLC layer when RLC acknowledged mode was used in the eNB.

FIG. 2 shows a signalling diagram illustrating a delivery of user data to a UE (WCD 101) sent by a SCEF 210 according to an embodiment of the present solution. FIG. 2 illustrates a procedure in which the SCS 220/AS 240 sends non-IP data to a given UE as identified via External Identifier or a Mobile Station International Subscriber Directory Number (MSISDN) or similar.

Action 201. If the SCS 220/AS 230 has already activated the NIDD service for a given UE (WCD 101), and has downlink non-IP data to send to the UE, the SCS/AS sends a NIDD Submit Request (External Identifier or MSISDN, SCS/AS Reference ID, non-IP data) message to the SCEF.

Action 202. If an SCEF EPS bearer context corresponding to the External Identifier or MSISDN included in step 201 is found, then the SCEF 210 checks whether the SCS 220/AS 230 is authorised to send NIDD requests and that the SCS 230 has not exceeded its quota (e.g. 200 bytes in 24 hrs) or rate (e.g. 10 bytes/hour) of data submission. If this check fails, the SCEF 210 sends a NIDD Submit Response (action 205) with a cause value indicating the reason for the failure condition and the flow stops at this step. Otherwise, the flow continues with action 203.

If no SCEF EPS bearer context is found, then the SCEF 210, depending on configuration, may either:

send a NIDD Submit Response with appropriate error cause value. The flow stops at this step; or perform device triggering towards the UE (using T4 SMS trigger) to establish a Non-IP PDN connection towards the SCEF 210. In this case, action 205 with an appropriate cause value is executed; or accept the NIDD Submit Request, and execute action 205 with an appropriate cause value, and wait for the UE to perform a procedure causing the establishment of a PDN connection to the SCEF. The duration for which the SCEF may wait for establishment of a PDN connection to the SCEF for the given UE is implementation dependent.

Action 203. If an SCEF EPS bearer context corresponding to the External Identifier or MSISDN included in step 201 is found, then the SCEF 210 sends a NIDD Submit Request (User Identity, EPS Bearer ID, SCEF ID, non-IP data, SCEF Wait Time, Maximum Re-transmission time) message toward the MME 105. The SCEF Wait Time indicates how long the SCEF 210 is prepared to wait for MME 105 response. Maximum Re-transmission indicates how long the SCEF 210 is prepared to re-transmit the message. If the IWK-SCEF 240 receives a NIDD Submit Request message from the SCEF 210, it relays the message to the MME 105.

Action 204. If the MME 105 can immediately deliver the non-IP data to the UE e.g. when UE is already in ECM_CONNECTED mode, or UE is in ECM_IDLE and the MME 105 can initiate paging procedure, the procedure proceeds at action 8.

If the MME 105 is aware of the UE being temporarily unreachable, or if the MME 105 that the UE is not scheduled to be reachable within the SCEF Wait Time, while using power saving functions e.g. UE Power Saving Mode or extended idle mode DRX, then the MME 105 may send a NIDD Submit Response (Cause, Requested Re-Transmission Time) message towards the SCEF 210. The Cause parameter indicates that Non-IP data was not delivered to the UE, as the UE is temporarily not reachable due to power saving but the MME 105 will notify the SCEF 210 when the MME 105 determines that the UE is reachable. The MME 105 sets the Not Reachable for NIDD flag in the EMM context for this UE and stores the corresponding SCEF address. If the Maximum Re-transmission Time was included in the Request, the MME 105 may indicate in Requested Re-Transmission time IE the time when the SCEF 210 is expected to re-transmit the DL data to the currently unreachable UE.

Action 205. The SCEF 210 may send a NIDD Submit Response to the SCS 220/AS 230 informing of the received results from the MME 105. If the SCEF 210 receives from the MME 105 a Cause value indicating that UE is temporarily not reachable due to power saving, the SCEF 210 can buffer the non-IP data requested at action 203 based on the configuration.

Action 206. When the MME 105 detects that the UE is reachable (e.g. when coming out of PSM mode by performing TAU/RAU, when initiating MO communication etc), or when the UE is about to become reachable (e.g. extended idle mode DRX cycle expiring, MME 105 anticipating MO communication pattern for the UE etc), and the MME 105 has the Not Reachable for NIDD flag set, then the MME 105 sends a NIDD Submit Indication (User Identity) message towards the SCEF 210. The MME 105 clears the Not Reachable for NIDD flag from its EMM context.

If the MME 105 included the Requested Re-transmission-Time in the NIDD Submit Response, the MME 105 sends a NIDD Submit Indication (User Identity) message towards the SCEF 210 only if the UE becomes reachable before the Requested Re-transmission Time. The MME 105 shall clear the Not Reachable for NIDD flag when the Requested Re-transmission Time expires and the UE has not become reachable yet.

Action 207. The SCEF 210 sends a NIDD Submit Request (User Identity, EPS Bearer ID, SCEF ID, non-IP data, SCEF Wait Time, Maximum Re-transmission time) message toward the MME 105.

Action 208. If required, the MME 105 pages the UE and delivers the non-IP data to the UE using data transfer via the MME procedure, e.g. as described below with reference to FIG. 3 or 4, see e.g. Actions 313-314 and Actions 411-412. Depending on operator configuration, the MME 105 may generate the necessary accounting information required for charging.

Action 209. If the MME 105 was able to initiate action 208, then the MME 105 sends a NIDD Submit Response (cause) message towards the SCEF 210 acknowledging the NIDD Submit Request from SCEF 210 received in action 203 or 207 above. If the eNodeB supported reliably hop-by-hop delivery, the cause is 'Success Acknowledged Delivery' otherwise 'Success Unacknowledged Delivery'. If the delivery failed, the cause is 'Unsuccessful delivery'. The SCEF 210 confirms the non-IP data transfer towards the SCS 220/AS 240 and may include the success reliability level.

The 'Success Acknowledged Delivery' implies reliable delivery to the UE, e.g. using RLC acknowledged mode. The 'Success Unacknowledged Delivery' successful result does not imply the data is successfully received at the UE, but just the MME 105 has sent the non-IP data in NAS signalling to the UE.

FIG. 3 shows a signalling diagram illustrating some details of the delivery of data to a UE (WCD 101) sent by the SCEF 210 according to an embodiment of the present solution.

Action 300. The UE is EPS attached and in ECM-Idle mode.

Action 301. When the S-GW 108 receives a downlink data packet/control signalling for a UE, if the S-GW context data indicates no downlink user plane TEID towards the MME 105, it buffers the downlink data packet and identifies which MME 105 is serving that UE.

If that MME 105 has requested the S-GW to throttle downlink low priority traffic and if the downlink data packet is received on a low priority bearer to be throttled, the S-GW drops the downlink data. The actions below are not executed.

If that MME 105 has requested the S-GW to delay sending the Downlink Data Notification, the S-GW buffers the downlink data and waits until the timer expires before continuing with action 302. If the DL-TEID and MME address for that UE is received before the expiry of the timer, the timer shall be cancelled and the Mobile Terminated Data transport procedure is progressed from step 11 as Downlink data are sent to the UE.

If the S-GW receives additional downlink data packets/control signalling for this UE before the expiry of the timer, the S-GW does not restart this timer.

Action 302. If the S-GW 108 is buffering data in action 301, the S-GW sends a Downlink Data Notification message (ARP, EPS Bearer ID) to the MME 105 for which it has control plane connectivity for the given UE. The ARP and EPS Bearer ID are always set in Downlink Data Notification. The MME 105 responds to the S-GW 108 with a Downlink Data Notification Ack message.

An MME 105 detecting that the UE is in a power saving state (e.g. Power Saving Mode) and cannot be reached by paging at the time of receiving Downlink data notification, shall invoke extended buffering depending on operator configuration, except for cases described in next paragraphs. The MME 105 derives the expected time before radio bearers can be established to the UE. The MME 105 then indicates Downlink Buffering Requested to the S-GW in the Downlink Data Notification Ack message and includes a Downlink Buffering Duration time and optionally a Downlink Buffering Suggested Packet Count. The MME 105 stores a new value for the Downlink Data Buffer Expiration Time in the MM context for the UE based on the Downlink Buffering Duration time and skips the remaining steps of this procedure. The Downlink Data Buffer Expiration Time is used for UEs using power saving state and indicates that there are buffered data in the S-GW 108 and that the user plane setup procedure is needed when the UE makes signalling with the network. When the Downlink Data Buffer Expiration Time has expired, the MME 105 considers no Downlink data to be buffered and no indications of Buffered Downlink Data Waiting are sent during context transfers at TAU procedures.

If there is an "Availability after DDN Failure" monitoring event configured for the UE in the MME 105, the MME does not invoke extended buffering. Instead, the MME 105 sets the Notify-on-available-after-DDN-failure flag to remember to send an "Availability after DDN Failure" notification when the UE becomes available. If there is a "UE Reachability" monitoring event configured for the UE in the MME 105, the MME does not invoke extended buffering.

When "Availability after DDN failure" and "UE reachability" monitoring events are used for a UE, the application server is assumed to send data only when the UE is reachable, hence no extended buffering is needed. If there are multiple application servers, the event notifications and extended buffering may be needed simultaneously. It is assumed this is handled through additional information based on SLA as described in the next paragraph.

The MME 105 may use additional information based on a SLA with the MTC user for when to invoke extended buffering, e.g. only invoke it for a certain APN, do not invoke it for certain subscribers, invoke extended buffering in conjunction with "Availability after DDN failure" and "UE reachability" monitoring events, etc.

A S-GW 108 that receives a Downlink Buffering Requested indication in a Downlink Data Notification Ack message stores a new value for the Downlink Data Buffer Expiration Time based on the Downlink Buffering Duration time and does not send any additional Downlink Data Notification if subsequent downlink data packets are received in the Serving GW before the buffer time Downlink Data Buffer Expiration Time has expired for the UE.

If the S-GW 108, while waiting for the user plane to be established, is triggered to send a second Downlink Data Notification for a bearer with higher priority (i.e. ARP priority level) than that of the bearer for which the first Downlink Data Notification was sent, the S-GW sends a new Downlink Data Notification message indicating the higher priority to the MME 105. If the S-GW receives additional downlink data packets for a bearer with same or lower priority than the first Downlink Data Notification was sent for or if the S-GW has sent the second Downlink Data Notification message indicating the higher priority and receives additional downlink data packets for this UE, the S-GW buffers these downlink data packets and does not send a new Downlink Data Notification.

If the S-GW 108, while waiting for the user plane to be established, receives a Modify Bearer Request message from an MME other than the one it sent a Downlink Data Notification message to, the S-GW re-sends the Downlink Data Notification message but only to the new MME from which it received the Modify Bearer Request message.

Upon reception of a Downlink Data Notification Ack message with an indication that the Downlink Data Notification message has been temporarily rejected and if the Downlink Data Notification is triggered by the arrival of downlink data packets at the S-GW 108, the S-GW may start a locally configured guard timer and buffers all downlink user packets received to the given UE and waits for a Modify Bearer Request message to come. Upon reception of a Modify Bearer Request message, the S-GW re-sends the Downlink Data Notification message but only to the new MME from which it received the Modify Bearer Request message. Otherwise the S-GW releases buffered downlink user packets upon expiry of the guard timer or upon receiving the Delete Session Request message from MME 105. If the S11-U is already established (buffering is in the MME 105), action 302 is not executed and action 311 is immediately executed. Actions 307, 308, 309, 310 are executed only if conditions are met when the NAS service request is received at action 306, as outlined below in the respective clauses.

An MME 105 detecting that the UE is in a power saving state (e.g. Power Saving Mode) and cannot be reached by paging at the time of receiving Downlink data, shall start extended buffering depending on operator configuration, except for cases described in next paragraphs. The MME derives the expected time before radio bearers can be established to the UE, stores a new value for the Downlink Data Buffer Expiration Time in the MM context for the UE and skips the remaining steps of this procedure. When the Downlink Data Buffer Expiration Time has expired, the MME considers no Downlink data to be buffered.

Also for the case of buffering in the MME 105 the "Availability after DDN Failure" monitoring event can be configured for the UE, even though the actual DDN is not received and the Downlink data is received. The "UE Reachability" monitoring event can be configured also. The extended buffering can also be configured as per what is described above in this step of the procedure for the case of buffering in S-GW 108.

Action 303. If the UE is registered in the MME 105 and considered reachable, the MME 1105 sends a Paging message (NAS ID for paging, TAI(s), UE identity based DRX index, Paging DRX length, list of CSG IDs for paging, Paging Priority indication) to each eNodeB 102 belonging to the tracking area(s) in which the UE is registered.

Paging priority indication is included only:
  if the MME 105 receives a Downlink Data Notification (or a Downlink packet for a EPS bearer, for the case of buffering in MME 105) with an ARP priority level associated with priority services, as configured by the operator.
  One Paging Priority level can be used for multiple ARP priority level values. The mapping of ARP priority level values to Paging Priority level (or levels) is configured by operator policy.

During a congestion situation the eNodeB 102 may prioritise the paging of UEs according to the Paging Priority indications.

If the MME 105, while waiting for a UE response to the Paging Request message sent without Paging Priority indication, receives a Downlink Data Notification (or a Downlink packet for a EPS bearer, for the case of buffering in MME 105) which indicates an ARP priority level associated with priority services, as configured by the operator, the MME 105 shall send another paging message with the suitable Paging Priority.

When the MME 105 is configured to support CSG paging optimisation in the CN, the MME should avoid sending Paging messages to those eNodeB(s) with CSG cells for which the UE does not have a CSG subscription. When the MME is configured to support CSG paging optimisation in the HeNB Subsystem, the list of CSG IDs for paging is included in the Paging message. For CSG paging optimisation, the CSG IDs of expired CSG subscriptions and valid CSG subscriptions are both included in the list. If the UE has emergency bearer service the MME shall not perform the CSG paging optimisation.

The MME 105 and the E-UTRAN 103 may support further paging optimisations in order to reduce the signalling load and the network resources used to successfully page a UE by one or several following means:
  by the MME 105 implementating specific paging strategies (e.g. the S1 Paging message is sent to the eNB 102 that served the UE last);
  by the MME 105 considering Information On Recommended Cells And eNodeBs provided by the E-UTRAN at transition to ECM IDLE. The MME takes the eNB related part of this information into account to determine the eNBs 102 to be paged, and provides the information on recommended cells within the S1 Paging message to each of these eNBs;
  by the E-UTRAN 103 considering the Paging Attempt Count Information provided by the MME 105 at paging.

When implementing such optimisations/strategies, the MME 105 shall take into account any PSM active timer and the DRX interval for the UE.

If the UE Radio Capability for Paging Information is available in the MME 105, the MME adds the UE Radio Capability for Paging Information in the S1 Paging message to the eNB 102.

If the Information on Recommended Cells And ENBs For Paging is available in the MME 105, the MME shall take that information into account to determine the eNBs for paging and, when paging an eNB 102, the MME may transparently convey the information on recommended cells to the eNB.

The MME 105 may include in the S1AP Paging message (s) the paging attempt count information. The paging attempt count information shall be the same for all eNBs selected by the MME for paging.

If the MME 105 has Information for Enhanced Coverage stored, the MME shall include it in the Paging message for all eNBs selected by the MME for paging.

Action 304. If eNodeBs receive paging messages from the MME 105, the UE is paged by the eNodeBs.

Action 305-306. As the UE is in the ECM-IDLE state, upon reception of paging indication, the UE sends a UE triggered Service Request NAS message over RRC Connection request and an S1-AP initial message or similar. The eNodeB 102 indicates in the S1-AP Initial UE message or similar if the eNodeB 102 supports acknowledgments for downlink NAS data Packet Data Units (PDUs) (including e.g. non-IP data units), e.g. based on RLC acknowledged mode. The Service Request NAS message, when C-IoT Control Plane optimisation applies, does not trigger Data radio bearer establishment by the MME 105 and the MME can immediately send Downlink Data it receives using a NAS PDU to the eNodeB 102. The MME 105 supervises the paging procedure with a timer. If the MME 105 receives no response from the UE to the Paging Request message, it may repeat the paging according to any applicable paging strategy described in action 303.

If the MME 105 receives no response from the UE after this paging repetition procedure, it shall use the Downlink Data Notification Reject message to notify the S-GW 108 about the paging failure (or, equivalently, if the buffering is in the MME, the MME simply discards data for the UE locally), unless the MME is aware of an ongoing MM procedure that prevents the UE from responding, i.e. the MME received a Context Request message indicating that the UE performs TAU with another MME. When a Downlink Data Notification Reject message is received, the S-GW 108 deletes the buffered packet(s). The S-GW 108 may invoke the procedure P-GW Pause of Charging if UE is in ECM IDLE and the PDN GW has enabled "PDN charging pause" feature. If buffering is in the MME, Pause Charging is triggered by the MME 105 via a Release Access Bearer Request to the S-GW (not shown in FIG. 3) including a "Abnormal Release of Radio Link" cause, which releases the S11-U.

To assist the MME 105 in any NAS PDU retransmission strategies, the eNB 102 indicates the UE's Coverage Level to the MME 105. The MME 105 performs (and the UE responds to) any EMM or ESM procedures if necessary, e.g. the security related procedures. Actions 307 to 311 can continue in parallel to this, however, steps 312 and 313 shall await completion of all the EMM and ESM procedures.

Action 307. If the S11-U is not established, the MME 105 sends a Modify Bearer Request message (MME address, MME TEID DL, Delay Downlink Packet Notification Request, RAT Type) for each PDN connection to the S-GW 108. The S-GW 108 is now able to transmit downlink data towards the UE. The usage of the Delay Downlink Packet Notification Request Information Element is specified with reference to the UE initiated service request procedure, but it equally applies in this case. The MME 105 shall indicate S11-U tunnelling of NAS user data and send its own S11-U IP address and MME DL TEID for DL data forwarding by the S-GW 108. Also, regardless of whether the S11-U was already established:

If the P-GW 110 requested UE's location and/or User CSG information and the UE's location and/or User CSG information has changed, the MME 105 shall send the Modify Bearer Request message and also includes the User Location Information IE and/or User CSG Information IE in this message.

If the Serving Network IE has changed compared to the last reported Serving Network IE then the MME 105 shall send the Modify Bearer Request message and also includes the Serving Network IE in this message.

If the UE Time Zone has changed compared to the last reported UE Time Zone then the MME 105 shall send the Modify Bearer Request message and include the UE Time Zone IE in this message.

If the Radio Access Technology (RAT) currently used is NB-IOT this shall be reported as different from other-E-UTRA flavors.

Action 308. If the RAT Type has changed compared to the last reported RAT Type or if the UE's Location and/or Info IEs and/or UE Time Zone and Serving Network id are present in action 307, the S-GW shall send the Modify Bearer Request message (RAT Type) to the P-GW 110. User Location Information IE and/or User CSG Information IE and/or Serving Network IE and/or UE Time Zone are also included if they are present in action 307.

If the Modify Bearer Request message is not sent because of above reasons and the P-GW charging is paused, then the S-GW 108 shall send a Modify Bearer Request message with PDN Charging Pause Stop Indication to inform the P-GW 110 that the charging is no longer paused. Other IEs are not included in this message.

Action 309. The P-GW 110 sends the Modify Bearer Response to the S-GW 108.

Action 310. If a Modify Bearer Request message was sent at action 307, the S-GW 108 shall return a Modify Bearer Response (Serving GW address and TEID for uplink traffic) to the MME 105 as a response to a Modify Bearer Request message. The S-GW address for S11-U User Plane and S-GW TEID are used by the MME 105 to forward UL data to the S-GW 108.

Action 311. Buffered (if S11-U was not established) Downlink data (e.g. such as non-IP data) is sent by the S-GW 108 to the MME 105.

Actions 312-313. The MME 105 encrypts and integrity protects the Downlink data received in action 311 above and sends it to the eNodeB 102, preferably using a NAS PDU preferably carried by a Downlink S1-AP message or similar. If the eNodeB 102 supports acknowledgements of downlink NAS data PDUs, the MME 105 indicates in the Downlink S1-AP message or similar that an acknowledgment of the data delivery is requested (positive and negative depending on result) from the eNodeB 102. This parameter makes possible to avoid unnecessary acknowledgement signaling from eNB 102 to MME 105 when not required. For IP PDN type PDN connections configured to support Header Compression, the MME 105 shall apply header compression before encapsulating data into the NAS message.

If the eNodeB 102 reports an unsuccessful delivery of the data, e.g. using a S1-AP NAS Non Delivery Indication, (the MME 105 may e.g. decide that it may have been because of a cell change) the MME should wait for some time, e.g. until the UE has changed cell and re-established contact with the MME 105, and then resend the Downlink S1-AP message to the eNodeB 102. If the eNodeB 102 still reports an unsuccessful delivery the the MME 105 should report an unsuccessful delivery to the SCEF. This should also preferably be done in case of a T6a procedure. If the eNodeB 102 reports a successful delivery, e.g. with a S1-AP NAS Delivery Indication and if the Downlink data was received over the T6a interface, the MME 105 should respond to the SCEF 210, see e.g. action 209 described above referring to FIG. 2. If the eNodeB 102 doesn't support acknowledgement of a successful delivery of the data to the UE, e.g. supports a S1-AP NAS Delivery Indications, the MME 105 indicates a cause code 'Success Unacknowledged Delivery' to the SCEF 210. If the eNodeB 102 supports acknowledgement of a successful delivery of the data to the UE then the MME 105 indicates a cause code 'Success acknowledged Delivery' to the SCEF 210.

Action 314. The NAS PDU with data is delivered to the UE via a Downlink RRC message. This is taken by the UE as implicit acknowledgment of the Service Request message sent in action 305. If header compression was applied, to the PDN, the UE shall perform header decompression to rebuild the IP header.

Action 315. While the RRC connection is still up, further Uplink and Downlink data can be transferred using NAS PDUs. In action 316 an Uplink data transfer is shown using an Uplink RRC message encapsulating a NAS PDU with data. At any time the UE has no user plane bearers established, the UE may provide a Release Assistance Information with Uplink data in the NAS PDU.

For IP PDN type PDN connections configured to support Header Compression, the UE shall apply header compression before encapsulating it into the NAS message.

Action 316. The NAS PDU with data is send to the MME 105 in an Uplink S1-AP message.

Action 317. The data is checked for integrity and decrypted. If header compression was applied to the PDN, the MME 105 shall perform header decompression to rebuild the IP header.

Action 318. The MME 105 sends Uplink data to the PGW 110 via the S-GW 108 and preferably executes any action related to the presence of Release Assistance Information as follows:
- for the case where the release assistance information indicates there is no downlink data to follow the uplink data then unless the MME 105 is aware of pending MT traffic, and unless S1-U bearers exist, the MME 105 immediately releases the connection and therefore step 20 is executed.
- for the case where the release assistance information indicates that downlink data will follow the uplink transmission then unless the MME 105 is aware of additional pending MT traffic and unless S1-U bearers exist, the MME 105 sends a S1 UE Context Release Command to the eNodeB 102 immediately after the S1-AP message including the Downlink data encapsulated in NAS PDU.

Action 319. If no NAS activity exists for a while the eNB 102 detects inactivity and executes action 320.

Action 320. The eNB 102 starts an eNodeB initiated S1 release procedure or a Connection Suspend Procedure.

FIG. 4 shows a signalling diagram illustrating some details of the delivery of data to a UE (WCD 101) sent by the SCEF 210 according to an embodiment of the present solution.

Action 400. The UE is in ECM-Idle mode.

Action 401. The UE establishes a RRC connection and sends as part of it an integrity protected NASPDU. The NAS PDU carries the EPS Bearer ID and encrypted Uplink Data. The UE may also indicate in a Release Assistance Information in the NAS PDU whether no further Uplink or Downlink Data transmissions are expected, or only a single Downlink data transmission (e.g. Acknowledgement or response to Uplink data) subsequent to this Uplink Data transmission is expected. If a cell change happens before the UE has received acknowledgement of successful uplink transmission, the UE shall retransmit the NAS PDU when connectivity has been established in the new cell.

Action 402. The NAS PDU sent in action 401 is relayed to the MME 105 by the eNodeB 102, preferably using a S1-AP Initial UE message or similar. The eNodeB 102 indicates in the S1-AP Initial UE message or similar if the eNodeB 102 supports acknowledgments for downlink NAS data Packet Data Units (PDUs) (including e.g. non-IP data units), e.g. based on RLC acknowledged mode.

To assist the MME 105 in any NAS PDU retransmission strategies, the eNB 102 may indicate the UE's Coverage Level to the MME 105.

Action 403. The MME 105 checks the integrity of the incoming NAS PDU and decrypts the data it contains. The MME 105 shall decompress the IP header if header compression applies to the PDN connection.

The MME 105 performs (and the UE responds to) any EMM or ESM procedures if necessary, e.g. the security related procedures. Action 404 to 409 can continue in parallel to this, however, actions 410 and 411 shall await completion of all the EMM and ESM procedures.

Action 404.

404*a*. If the S11-U connection is not established, the MME 105 sends a Modify Bearer Request message (MME address, MME TEID DL, Delay Downlink Packet Notification Request, RAT Type, MO Exception data counter) for each PDN connection to the S-GW 108. The S-GW 108 is now able to transmit downlink data towards the UE. The usage of the Delay Downlink Packet Notification Request Information Element is specified with reference to the UE initiated service request procedure, but it equally applies in this case. The MME 105 shall indicate S11-U tunnelling of NAS user data and send its own S11-U IP address and MME DL TEID for DL data forwarding by the S-GW 108. Also, regardless of whether the S11-U was already established:
- If the P-GW 110 requested UE's location and/or User CSG information and the UE's location and/or User CSG information has changed, the MME 105 shall send the Modify Bearer Request message and also includes the User Location Information IE and/or User CSG Information IE in this message.
- If the Serving Network IE has changed compared to the last reported Serving Network IE then the MME 105 shall send the Modify Bearer Request message and also includes the Serving Network IE in this message.
- If the UE Time Zone has changed compared to the last reported UE Time Zone then the MME 105 shall send the Modify Bearer Request message and include the UE Time Zone IE in this message.

If the RAT currently used is NB-IOT this shall be reported as different from other E-UTRA flavors.

The MME 105 only includes MO Exception data counter if the RRC establishment cause is set to "MO exception data" and the UE is accessing via the NB-IoT RAT. The S-GW 108 indicates each use of this RRC establishment cause by the related counter on its CDR. The MME maintains the MO Exception Data Counter and sends it to the S-GW 108.

404*b*. If the S11-U connection is established and the UE is accessing via the NB-IoT RAT with the RRC establishment cause set to "MO exception data", the MME 105 should notify the S-GW 108. The MME 105 maintains the MO Exception Data Counter and sends it to the S-GW 108.

Action 405. If the RAT Type has changed compared to the last reported RAT Type or if the UE's Location and/or Info IEs and/or UE Time Zone and Serving Network id are present in action 404, the S-GW 108 shall send the Modify Bearer Request message (RAT Type, RRC establishment cause) to the P-GW 110. User Location Information IE and/or User CSG Information IE and/or Serving Network IE and/or UE Time Zone are also included if they are present in action 404.

If the Modify Bearer Request message is not sent because of above reasons and the P-GW charging is paused, then the SGWS-GW shall send a Modify Bearer Request message with PDN Charging Pause Stop Indication to inform the P-GW 110 that the charging is no longer paused. Other IEs are not included in this message.

If the Modify Bearer Request message is not sent because of above reasons but the MME 105 indicated MO Exception data counter, then the S-GW 108 should notify the P-GW 110 that this RRC establishment cause has been used by the indication of the MO Exception Data Counter. The S-GW 108 indicates each use of this RRC establishment cause by the related counter on its CDR.

Action 406. The P-GW 110 sends the Modify Bearer Response to the S-GW 108.

The P-GW 110 indicates each use of the RRC establishment cause "MO Exception Data" by the related counter on its CDR.

Action 407. If a Modify Bearer Request message was sent at action 404 the S-GW 108 shall return a Modify Bearer Response (Serving GW address and TEID for uplink traffic) to the MME 105 as a response to a Modify Bearer Request message. The Serving GW address for S11-U User Plane and Serving GW TEID are used by the MME to forward UL data to the S-GW.

Action 408. The MME 105 sends Uplink data to the P-GW 110 via the S-GW 108.

Action 409. If no Downlink Data are expected based on the Release Assistance Information from the UE in action 401, this means that all application layer data exchanges have completed with the UL data transfer, and therefore, unless the MME 105 is aware of pending MT traffic and unless S1-U bearers are established, the MME immediately releases the connection and therefore action 414 is executed.

Otherwise, Downlink data may arrive at the P-GW 110 and the P-GW sends them to the MME 105 via the S-GW 108. If no data is received actions 410-412 are skipped and the eNB 102 may trigger action 414 after action 413 detects no activity. While the RRC connection is active, the UE may still send Uplink data and may receive Downlink data in NAS PDUs that are carried in a S1AP Uplink or (respectively) Downlink messages (not shown in the figure). At any time the UE has no user plane bearers established it may provide Release Assistance Information with the Uplink data.

Action 410. If Downlink data are received in action 409, the MME 105 encrypts and integrity protects the Downlink data.

Action 411. If action 410 is executed then Downlink data are encapsulated in a NAS PDU and sent to the eNB 102, preferably in a Downlink S1-AP Message or similar. If the eNodeB 102 supports acknowledgements of downlink NAS data PDUs, the MME 105 indicates in the Downlink S1-AP message or similar that an acknowledgment of the data delivery is requested (positive or negative depending on result) from the eNodeB 102. This parameter makes possible to avoid unnecessary acknowledgement signaling from eNB 102 to MME 105 when not required. For IP PDN type PDN connections configured to support Header Compression, the MME shall apply header compression before encapsulating data into the NAS message. If action 410 is not executed, the MME 105 sends Connection Establishment Indication message to the eNB 102. The UE Radio Capability may be provided from the MME to the eNB in the Connection Establishment Indication message, and the eNB shall store the received UE Radio Capability information. If the Release Assistance Information was received with Uplink data and it indicated that Downlink data was expected, it means that the next downlink packet following the sending of the Release Assistance Information is the last packet of the application layer data exchange, then for this case, unless the MME is aware of additional pending MT traffic and unless S1-U bearers are established, the MME sends a S1 UE Context Release Command immediately after the S1-AP message including the Downlink data encapsulated in NAS PDU so that the an indication that the eNodeB 102 shall release the RRC connection after successfully sending data to the UE.

If the eNodeB 102 reports an unsuccessful delivery of the data, e.g. using a S1-AP NAS Non Delivery Indication, (the MME 105 may e.g. decide that it may have been because of a cell change) the MME should wait for some time, e.g. until the UE has changed cell and re-established contact with the MME 105, and then resend the Downlink S1-AP message to the eNodeB 102. If the eNodeB 102 still reports an unsuccessful delivery the the MME 105 should report an unsuccessful delivery to the SCEF. This should also preferably be done in case of a T6*a* procedure. If the eNodeB 102 reports a successful delivery, e.g. with a S1-AP NAS Delivery Indication and if the Downlink data was received over the T6*a* interface, the MME 105 should respond to the SCEF 210, see e.g. action 209 described above referring to FIG. 2. If the eNodeB 102 doesn't support acknowledgement of a successful delivery of the data to the UE, e.g. supports a S1-AP NAS Delivery Indications, the MME 105 indicates a cause code 'Success Unacknowledged Delivery' to the SCEF 210. If the eNodeB 102 supports acknowledgement of a successful delivery of the data to the UE then the MME 105 indicates a cause code 'Success acknowledged Delivery' to the SCEF 210.

Action 412. The eNB 102 sends a RRC Downlink data message including the Downlink data encapsulated in NAS PDU. If in action 411 the S1-AP message with the NAS DATA PDU was followed by a S1 UE Context Release Command action 414 is completed promptly after the Downlink Data transmission of the NAS PDU to the UE is complete at the eNB 102 and the eNB does not need to enter action 413. If header compression was applied to the PDN, the UE would perform header decompression to rebuild the IP header.

Action 413. If no NAS PDU activity exists for a while, the eNB 102 starts an S1 release in action 414.

Action 414. An S1 release procedure triggered by the eNodeB 102 or the MME 105. Alternatively, if the MME 105 in action 411 sent S1 UE Context Release Command then the procedure starts with a Connection Suspend Procedure or similar.

Figure 5:
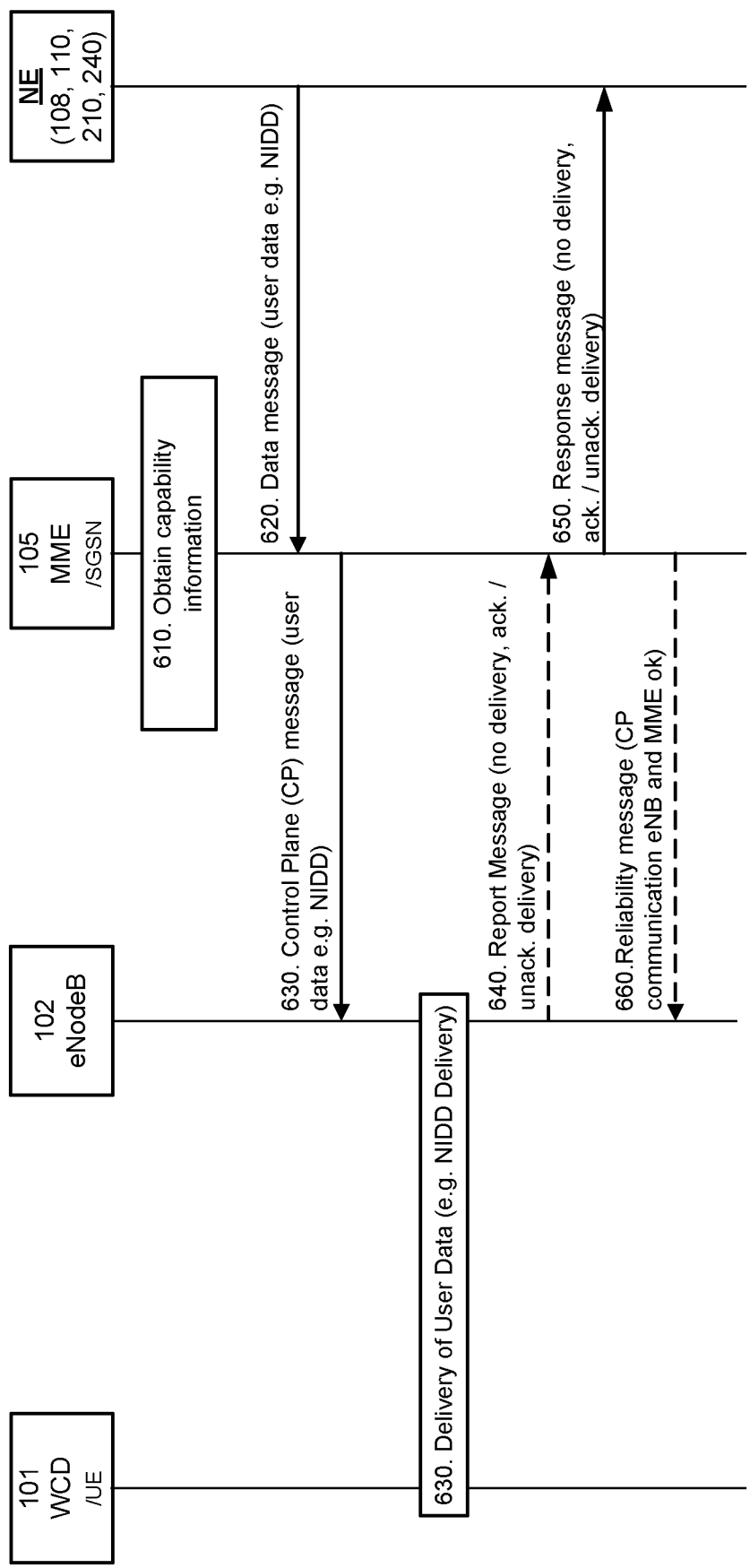
FIG. 5 shows a schematic signalling diagram illustrating the delivering of data to a WCD sent by a NE according to an embodiment of the present solution.

FIG. 5 shows a schematic signalling diagram illustrating the delivering of data to a WCD sent by a NE according to an embodiment of the present solution.

The delivery method shown in figure is preferably performed in a MME 105 for delivering data to a WCD 101 that is served by the MME 105. While performing the method it is preferred that the operates in a communication network 10b, 10c comprising a Network Entity (NE), e.g. a SGW 108, a PGW 110, a SCEF 210 or an IWK-SCEF 240, and a RAN node 102 serving the WCD 101.

The delivery method comprises the following actions, which may be performed in any suitable order:

Action 610. Obtaining capability information indicating whether the RAN node 102 supports acknowledgement of a successful delivery of data to the WCD 101. This action corresponds to actions or steps 306, 402 discussed above.

Action 620. Receiving a data message sent by the NE, which data message comprises user data intended for the WCD. This action corresponds to actions or steps 207, 311, 409 discussed above.

Action 630. Sending a control plane message comprising the user data to the RAN node 102 for further delivery to the WCD 101. This action corresponds to actions or steps 313, 411 above.

Action 640. Here a report may be received from the RAN node 102 indicating that the user data was not successfully delivered to the WCD 101. This action corresponds to actions or steps 313, 411 discussed above.

Alternatively, when the RAN node 102 supports acknowledgement of data delivery to the WCD 101, then an acknowledgement may be received from the RAN node 102 indicating that the user data sent in action 63o was successfully delivered to the WCD 101. This action corresponds to actions or steps 313, 411 discussed above.

Alternatively, when the RAN node 102 does not support said acknowledgement of data delivery to the WCD 101, then no acknowledgement will be received from the RAN node 102 indicating that the user data sent in action 630 was successfully delivered to the WCD 101. This has been illustrated by a dashed line in FIG. 5. This action corresponds to actions or steps 313, 411 discussed above.

Action 650. Sending a response to the NE. This action corresponds to actions or steps 209 discussed above.

The response either:
a) indicates an unsuccessful delivery of the user data to the WCD 101 when a report is received from the RAN node indicating that the user data was not successfully delivered to the WCD 101; and otherwise
b) indicating an acknowledged delivery of the user data to the WCD 101 when the RAN node 102 supports said acknowledgement and an acknowledgement is received from the RAN node 102 indicating that the user data was successfully delivered to the WCD 101; and
c) indicating an unacknowledged delivery of user data to the WCD 101 when the RAN node 102 does not support said acknowledgement.

Action 660. Sending, the RAN node 102 supports acknowledgement of data delivery to the WCD 101, a reliability message intended for the WCD 101 indicating that control plane communication of user data between the RAN node 102 and the mobility management node 105 is reliable. This actions is optional, which has been indicated by a dashed line in FIG. 5

Figure 6:
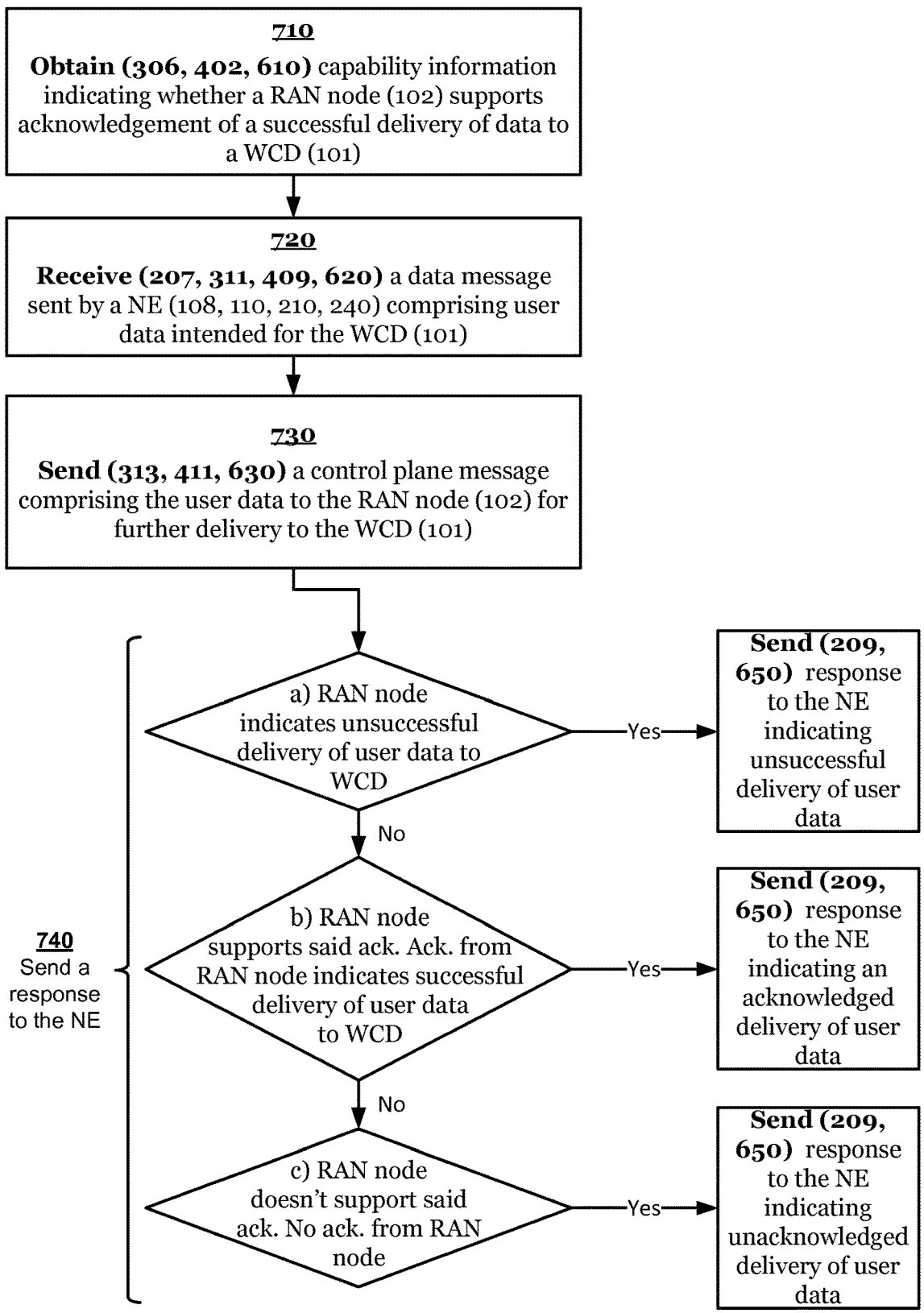
FIG. 6 shows a flowchart illustrating a method according to an embodiment of the present solution.

FIG. 6 shows a flowchart illustrating a method according to an embodiment of the present solution.

The method is preferably performed in a MME 105 for delivering data to a WCD 101 that is served by the MME 105. While performing the method it is preferred that the operates in a communication network 10b, 10c comprising a Network Entity (NE), e.g. a SGW 108, a PGW 110, a SCEF 210 or an IWK-SCEF 240, and a RAN node 102 serving the WCD 101.

The method comprises the following steps, which may be performed in any suitable order:

Step 710. Obtaining capability information indicating whether the RAN node 102 supports acknowledgement of a successful delivery of data to the WCD 101. This action corresponds to actions or steps 306, 402, 610 discussed above.

Step 720. Receiving a data message sent by the NE, which data message comprises user data intended for the WCD. This action corresponds to actions or steps 207, 311, 409, 620 discussed above.

Step 730. Sending a control plane message comprising the user data to the RAN node 102 for further delivery to the WCD 101. This action corresponds to actions or steps 313, 411, 630 discussed above.

Step 740. Sending a response to the NE. This action corresponds to actions or steps 209, 650 discussed above.

The response either:
d) indicates an unsuccessful delivery of the user data to the WCD 101 when a report is received from the RAN node indicating that the user data was not successfully delivered to the WCD 101; and otherwise
e) indicating an acknowledged delivery of the user data to the WCD 101 when the RAN node 102 supports said acknowledgement and an acknowledgement is received from the RAN node 102 indicating that the user data was successfully delivered to the WCD 101; and
f) indicating an unacknowledged delivery of user data to the WCD 101 when the RAN node 102 does not support said acknowledgement.

Figure 7A:
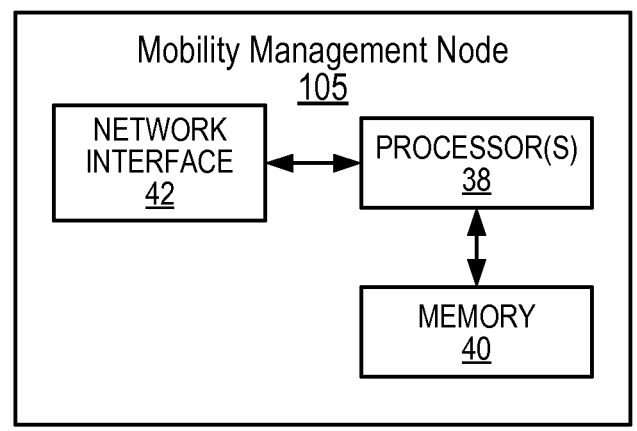
FIG. 7a illustrates a mobility management node according to an embodiment of the present solution.

FIG. 7a is a schematic block diagram of a mobility management node according to some embodiments of the present disclosure. Here, the mobility management node may be a core network node such as, for example, the MME 105 or an SGSN 118. As illustrated, the n mobility management node includes one or more processors 38 (e.g., Central Processing Units (CPUs), Application Specific Integrated Circuits (ASICs), Field Programmable Gate Arrays (FPGAs), and/or the like), memory 40, and a network interface 42. In some embodiments, the functionality of the mobility management node (e.g., the functionality of the MME 105) described above may be fully or partially implemented in software that is, e.g., stored in the memory 40 and executed by the processor(s) 38.

In some embodiments, a computer program including instructions which, when executed by at least one processor, causes the at least one processor to carry out the functionality of a network node according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

Figure 7B:
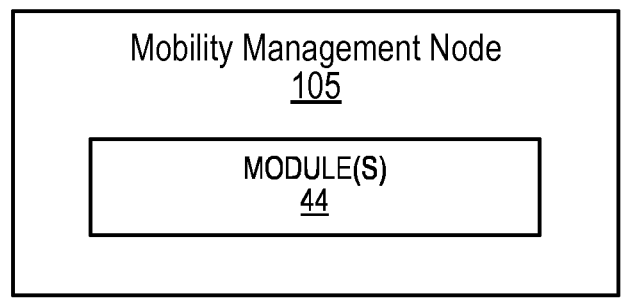
FIG. 7b illustrates a mobility management node according to some other embodiments of the present solution.

FIG. 7b is a schematic block diagram of the mobility management node 105 according to some other embodiments of the present disclosure. The mobility management node includes one or more modules 44, each of which is implemented in software. The module(s) 44 provide the functionality of the mobility management node described herein. As an example, if the mobility management node 105 is the MME 105, then the module(s) 44 may include: an obtaining module operable to obtain capability information indicating whether the RAN node 102 supports acknowledgement of a successful delivery of data to the WCD 101; a receiving module operable to receive a data message sent by the NE (108, 110, 210, 240) comprising user data intended for the WCD 101; and a sending module operable to send a control plane message comprising the user data to the RAN node 102 for further delivery to the WCD 101, and operable to send a response to the NE (108, 110, 210, 240) indicating the status of the user data delivery to the WCD 101, as described above.

Some embodiments described above may be summarised in the following manner:

A first embodiment is directed to a method method in a mobility management node for delivering data to a WCD served by the mobility management node, operating in a communication network comprising a NE and a RAN node serving the WCD.

The method comprises:
obtaining capability information indicating whether the RAN node supports acknowledgement of a successful delivery of data to the WCD,
receiving a data message sent by the NE comprising user data intended for the WCD,
sending a control plane message comprising the user data to the RAN node for further delivery to the WCD,
sending a response to the NE:
  a) indicating an unsuccessful delivery of the user data to the WCD when a report is received from the RAN node indicating that the user data was not successfully delivered to the WCD; and otherwise;
  b) indicating an acknowledged delivery of the user data to the WCD when the RAN node supports said acknowledgement and an acknowledgement is received from the RAN node indicating that the user data was successfully delivered to the WCD;
  c) indicating an unacknowledged delivery of user data to the WCD when the RAN node does not support said acknowledgement.

The method may comprise:
receiving a report from the RAN node indicating that the user data was not successfully delivered to the WCD; and
before sending the response to the NE, resending the control plane message comprising the user data to the RAN node for further delivery to the WCD.

The method wherein the obtaining may comprise: receiving an initial message from the RAN node indicating whether the RAN node supports acknowledgement of a successful delivery of data to the WCD.

The initial message may correspond to an attach message or Tracking Area Update, TAU, message.

The control plane message may comprise information requesting an acknowledgment from the RAN node when the RAN node supports said acknowledgement.

The control plane message may be a Non-Access Stratum, NAS, message.

The control plane message may be a S1 Application Protocol, S1AP message. For more information about S1AP messages, see e.g. the specification 3GPP TS 36.413.

The control plane message may be a NIDD, Submit Request message.

The user data may be non-IP data.

The method may comprise: sending, when the RAN node supports said acknowledgement, a reliability message intended for the WCD indicating that control plane communication of user data between the RAN node and the mobility management node is reliable.

The reliability message may correspond to an attach message or a TAU message.

The reliability message may be a Non-Access Stratum, NAS, message.

The NE may be a S-GW or a P-GW or a SCEF or an IWK-SCEF.

Some other embodiments described above may be summarised in the following manner:

A second embodiment is directed to a mobility management node for delivering data to a WCD, where the mobility management node is configured to operatively serve the WCD in a communication network comprising a NE and a RAN node serving the WCD.

The mobility management node comprises: a network interface; one or more processors; and memory storing instructions executable by the one or more processors whereby the mobility management node is operable to:
obtain capability information indicating whether the RAN node supports acknowledgement of a successful delivery of data to the WCD,
receive a data message sent by the NE comprising user data intended for the WCD,
send a control plane message comprising the user data to the RAN node for further delivery to the WCD,
send a response to the NE:
  a) indicating an unsuccessful delivery of the user data to the WCD when a report is received from the RAN node indicating that the user data was not successfully delivered to the WCD; and otherwise;
  b) indicating an acknowledged delivery of the user data to the WCD when the RAN node supports said acknowledgement and an acknowledgement is received from the RAN node indicating that the user data was successfully delivered to the WCD;
  c) indicating an unacknowledged delivery of user data to the WCD when the RAN node does not support said acknowledgement.

The mobility management node may be operable to:
receive a report from the RAN node indicating that the user data was not successfully delivered to the WCD; and
before sending the response to the NE, resend the control plane message comprising the user data to the RAN node for further delivery to the WCD.

The mobility management node may be operable obtain capability information by: receive an initial message from the RAN node indicating whether the RAN node supports acknowledgement of a successful delivery of data to the WCD.

The initial message may correspond to an attach message or Tracking Area Update, TAU, message.

The control plane message may comprise information requesting an acknowledgment from the RAN node when the RAN node supports said acknowledgement.

The control plane message may be a NAS message.

The control plane message may be a S1AP message.

The control plane message may be a NIDD Submit Request message.

The user data may be non-IP data.

The mobility management node may be operable to send, when the RAN node supports said acknowledgement, a reliability message intended for the WCD indicating that control plane communication of user data between the RAN node and the mobility management node is reliable.

The reliability message may correspond to an attach message or a TAU message.

The reliability message may be a NAS message.

The NE may be a S-GW or P-GW or a SCEF or an IWK-SCEF.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method in a mobility management node for delivering data to a wireless communication device, WCD, served by the mobility management node, operating in a communication network comprising a network entity, NE, and a radio access network, RAN, node serving the WCD, the method comprises:
obtaining capability information indicating whether the RAN node supports acknowledgement of a successful delivery of data to the WCD;
receiving a data message sent by the NE comprising user data intended for the WCD;
sending a control plane message comprising the user data to the RAN node for further delivery to the WCD; and
sending a response to the NE:
a) indicating an unsuccessful delivery of the user data to the WCD when a report is received from the RAN node indicating that the user data was not successfully delivered to the WCD; otherwise;
b) indicating an acknowledged delivery of the user data to the WCD when the RAN node supports said acknowledgement and an acknowledgement is received from the RAN node indicating that the user data was successfully delivered to the WCD;
c) indicating an unacknowledged delivery of user data to the WCD when the RAN node does not support said acknowledgement.

2. The method according to claim 1, wherein the method comprises:
sending, when the RAN node supports said acknowledgement, a reliability message intended for the WCD indicating that control plane communication of user data between the RAN node and the mobility management node is reliable.

3. The method according to claim 2, wherein the reliability message corresponds to an attach message or a TAU message.

4. The method according to claim 2, wherein the reliability message is a Non-Access Stratum, NAS, message.

5. The method according to claim 1, wherein the obtaining comprises:
receiving an initial message from the RAN node indicating whether the RAN node supports acknowledgement of a successful delivery of data to the WCD.

6. The method according to claim 5, wherein the initial message corresponds to an attach message or Tracking Area Update, TAU, message.

7. The method according to claim 1, wherein the method comprises:
receiving a report from the RAN node indicating that the user data was not successfully delivered to the WCD; and
before sending the response to the NE, resending the control plane message comprising the user data to the RAN node for further delivery to the WCD.

8. The method according to claim 1, wherein the control plane message comprises information requesting an acknowledgment from the RAN node when the RAN node supports said acknowledgement.

9. The method according to claim 1, wherein the control plane message is a Non-Access Stratum, NAS, message.

10. The method according to claim 1, wherein the control plane message is a S1 Application Protocol, S1AP message.

11. The method according to claim 1, wherein the control plane message is Non-IP Data Delivery, NIDD, Submit Request message.

12. The method according to claim 1, wherein the user data is non-IP data.

13. The method according to claim 1, wherein the NE is a Serving Gateway, S-GW, or a Packet Data Network, PDN, Gateway, P-GW, or a Service Capability Exposure Function, SCEF, or an Interworking SCEF, IWK-SCEF.

14. A mobility management node for delivering data to a wireless communication device, WCD, where the mobility management node is configured to operatively serve the WCD in a communication network comprising a network entity, NE, and a radio access network, RAN, node serving the WCD, the mobility management node comprises: a network interface; one or more processors; and memory storing instructions executable by the one or more processors whereby the mobility management node is operable to:
obtain capability information indicating whether the RAN node supports acknowledgement of a successful delivery of data to the WCD;
receive a data message sent by the NE comprising user data intended for the WCD;
send a control plane message comprising the user data to the RAN node for further delivery to the WCD; and
send a response to the NE:
a) indicating an unsuccessful delivery of the user data to the WCD when a report is received from the RAN node indicating that the user data was not successfully delivered to the WCD; otherwise;
b) indicating an acknowledged delivery of the user data to the WCD when the RAN node supports said acknowledgement and an acknowledgement is received from the RAN node indicating that the user data was successfully delivered to the WCD;
c) indicating an unacknowledged delivery of user data to the WCD when the RAN node does not support said acknowledgement.

15. The mobility management node according to claim 14, whereby the mobility management node is operable to:
send, when the RAN node supports said acknowledgement, a reliability message intended for the WCD indicating that control plane communication of user data between the RAN node and the mobility management node is reliable.

16. The mobility management node according to claim 15, wherein the reliability message corresponds to an attach message or a TAU message.

17. The mobility management node according to claim 15, wherein the reliability message is a Non-Access Stratum, NAS, message.

18. The mobility management node according to claim 14, wherein the obtaining comprises:
receive an initial message from the RAN node indicating whether the RAN node supports acknowledgement of a successful delivery of data to the WCD.

19. The mobility management node according to claim 18, wherein the initial message corresponds to an attach message or Tracking Area Update, TAU, message.

20. The mobility management node according to claim 14, whereby the mobility management node is operable to:
- receive a report from the RAN node indicating that the user data was not successfully delivered to the WCD; and
- before sending the response to the NE, resend the control plane message comprising the user data to the RAN node for further delivery to the WCD.

21. The mobility management node according to claim 14, wherein the control plane message comprises information requesting an acknowledgment from the RAN node when the RAN node supports said acknowledgement.

22. The mobility management node according to claim 14, wherein the control plane message is a Non-Access Stratum, NAS, message.

23. The mobility management node according to claim 14, wherein the control plane message is a S1 Application Protocol, S1AP message.

24. The mobility management node according to claim 14, wherein the control plane message is Non-IP Data Delivery, NIDD, Submit Request message.

25. The method mobility management node to claim 14, wherein the user data is non-IP data.

26. The mobility management node according to claim 14, wherein the NE is a Serving Gateway, S-GW, or a Packet Data Network, PDN, Gateway, P-GW, or a Service Capability Exposure Function, SCEF, or an Interworking SCEF, IWK-SCEF.

* * * * *

UNITED STATES PATENT AND TRADEMARK OFFICE
CERTIFICATE OF CORRECTION

PATENT NO. : 10,869,185 B2
APPLICATION NO. : 16/338818
DATED : December 15, 2020
INVENTOR(S) : Rönneke et al.

It is certified that error appears in the above-identified patent and that said Letters Patent is hereby corrected as shown below:

On the Title Page

In Item (57), under "ABSTRACT", in Column 2, Line 1, delete "to method" and insert -- to a method --, therefor.

In the Drawings

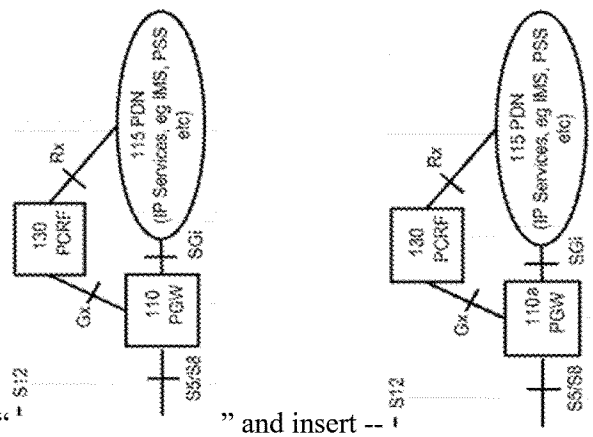

In Fig. 1a, Sheet 1 of 9, delete " " and insert -- --, therefor.

In Fig. 1a, Sheet 1 of 9, delete "FIG" and insert -- FIG. --, therefor at each occurrence throughout the figures.

In the Specification

In Column 1, Line 49, delete "termination Handover" and insert -- termination handover --, therefor.

In Column 1, Line 59, delete "FIG. 1*a* is shows a" and insert -- FIG. 1*a* shows a --, therefor.

In Column 2, Line 40, delete "E-UTRAN 101" and insert -- E-UTRAN 103 --, therefor.

Signed and Sealed this
First Day of June, 2021

Drew Hirshfeld
*Performing the Functions and Duties of the
Under Secretary of Commerce for Intellectual Property and
Director of the United States Patent and Trademark Office*

In Column 2, Line 61, delete "(terminating S₄" and insert -- (terminating S4 --, therefor.

In Column 4, Line 63, delete "communication network 10*b*" and insert -- communication network 10*c* --, therefor.

Figure 1B:
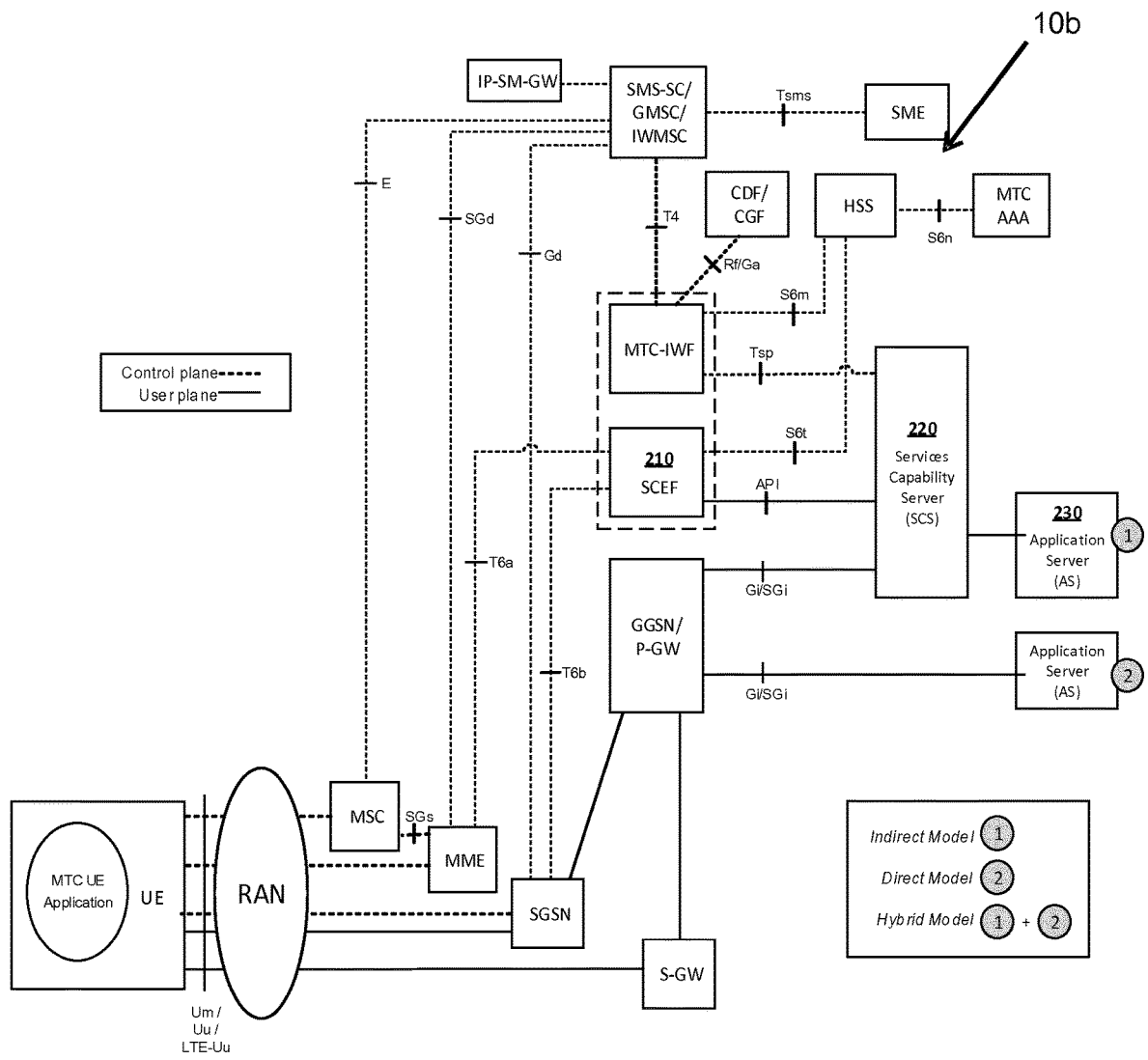
FIG. 1b shows a schematic block diagram of a known communication network (10b) wherein embodiments of the present solution may be performed.
Figure 1C:
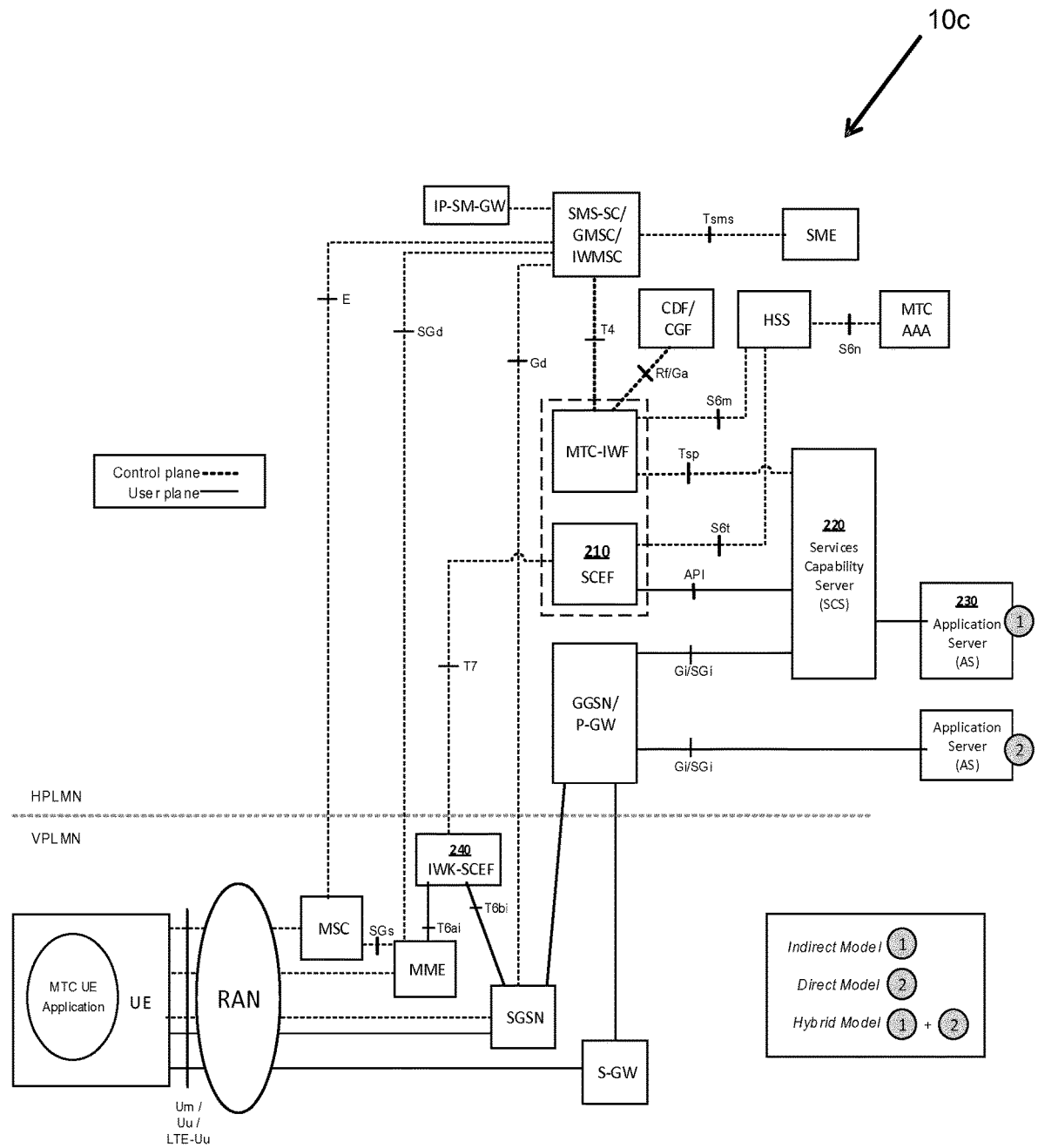
FIG. 1c shows a schematic block diagram of a known communication network (10a) wherein embodiments of the present solution may be performed.

In Column 5, Line 5, delete "FIGS. 10*b* and 10*c*" and insert -- FIGS. 1*b* and 1*c* --, therefor.

In Column 5, Line 16, delete "FIGS. 10*b*-10*c*" and insert -- FIGS. 1*b*-1*c* --, therefor.

In Column 5, Line 47, delete "FIGS. 10*b*-10*c*" and insert -- FIGS. 1*b*-1*c* --, therefor.

In Column 6, Lines 3-4, delete "FIGS. 10*b*-10*c*" and insert -- FIG. 1*c* --, therefor.

In Column 6, Lines 6-7, delete "FIGS. 10*b*-10*c*" and insert -- FIGS. 1*b*-1*c* --, therefor.

In Column 6, Line 18, delete "FIGS. 10*b*-10*c*" and insert -- FIGS. 1*b*-1*c* --, therefor.

In Column 8, Line 43, delete "communication network (10*a*)" and insert -- communication network (10*c*) --, therefor.

In Column 8, Line 52, delete "of a the delivery" and insert -- of the delivery --, therefor.

In Column 8, Line 60, delete "solution." and insert -- solution; --, therefor.

In Column 9, Line 12, delete "SCEF, which cause code can distinguish" and insert -- SCEF, which can cause code distinguish --, therefor.

In Column 9, Line 19, delete "indicated" and insert -- indicated. --, therefor.

In Column 10, Line 11, delete "SCS 220/AS 240" and insert -- SCS 220/AS 230 --, therefor.

In Column 11, Lines 56-57, delete "SCS 220/AS 240" and insert -- SCS 220/AS 230 --, therefor.

In Column 14, Line 52, delete "implementating" and insert -- implementing --, therefor.

In Column 14, Line 56, delete "And" and insert -- and --, therefor.

In Column 15, Line 5, delete "And ENBs For" and insert -- and eNBs for --, therefor.

In Column 16, Line 23, delete "NB-IOT" and insert -- NB-IoT --, therefor.

In Column 17, Line 5, delete "delivery the the" and insert -- delivery of the --, therefor.

In Column 18, Line 3, delete "NASPDU." and insert -- NAS PDU. --, therefor.
In Column 18, Line 62, delete "NB-IOT" and insert -- NB-IoT --, therefor.

In Column 20, Line 26, delete "the an indication" and insert -- the indication --, therefor.

In Column 20, Line 36, delete "delivery the the" and insert -- delivery of the --, therefor.

In Column 20, Line 63, delete "procedure triggered" and insert -- procedure is triggered --, therefor.

In Column 21, Line 32, delete "action 63o" and insert -- action 630 --, therefor.

In Column 22, Line 40, delete "the n mobility" and insert -- the mobility --, therefor.

In Column 23, Line 15, delete "to a method method in" and insert -- to a method in --, therefor.

In Column 24, Line 48, delete "operable obtain" and insert -- operable to obtain --, therefor.

In the Claims

In Column 27, Line 22, in Claim 25, delete "The method mobility management node to claim" and insert -- The mobility management node according to claim --, therefor.